United States Patent
Satyarthi et al.

(10) Patent No.: US 12,218,745 B2
(45) Date of Patent: Feb. 4, 2025

(54) COORDINATOR FOR MANAGING OPTICAL POWER CONTROLS IN A C+L BAND NETWORK

(71) Applicant: Infinera Corp., San Jose, CA (US)

(72) Inventors: Nikhil Satyarthi, Yelahanka (IN); Ashok Kunjidhapatham, Devarachikkanahalli (IN); Sanjeev Ramachandran, Karnataka (IN); Jonathan Buset, San Jose, CA (US); Baranidhar Ramanathan, Kasavanahalli (IN)

(73) Assignee: Infinera Corporation, San Jose, CA (US)

( * ) Notice: Subject to any disclaimer, the term of this patent is extended or adjusted under 35 U.S.C. 154(b) by 68 days.

(21) Appl. No.: 18/323,237

(22) Filed: May 24, 2023

(65) Prior Publication Data
US 2023/0308205 A1    Sep. 28, 2023

Related U.S. Application Data

(63) Continuation of application No. 18/152,296, filed on Jan. 10, 2023.

(60) Provisional application No. 63/298,173, filed on Jan. 10, 2022.

(51) Int. Cl.
*H04B 10/00* (2013.01)
*H04J 14/02* (2006.01)
*H04J 14/00* (2006.01)

(52) U.S. Cl.
CPC ...... *H04J 14/0217* (2013.01); *H04J 14/0221* (2013.01); *H04J 14/0212* (2013.01)

(58) Field of Classification Search
CPC ... H04Q 2011/0037; H04Q 2011/0052; H04Q 2011/0064; H04Q 2011/0073; H04Q 2011/0079; H04Q 2011/0086; H04J 14/0201; H04J 14/0202; H04J 14/021; H04J 14/0212; H04J 14/0267
See application file for complete search history.

(56) References Cited

U.S. PATENT DOCUMENTS 10,219,052 B2 *  2/2019  Zhu ..................... H04J 14/0212
2018/0109856 A1 *  4/2018  Honda ................ H04J 14/0257

* cited by examiner

*Primary Examiner* — Daniel G Dobson

(57) ABSTRACT

An optical network and a method of use are herein disclosed. The method comprises: receiving, by a DEMUX module of a local ROADM, a request from an upstream ROADM, the upstream ROADM being upstream from the local ROADM on a fiber optic line, the local ROADM comprising the DEMUX module and first and second MUX modules, the request including first instructions to perform an operation on the local ROADM; sending, by the DEMUX module, a distributed request to the first and second MUX modules, the distributed request including second instructions to perform the operation on the first and second MUX modules; attempting, by the first and second MUX modules, to perform the operation; and sending a consolidated response to the upstream ROADM indicative of one of a success and a failure of performing the operation on the first and second MUX modules.

20 Claims, 8 Drawing Sheets

COORDINATOR FOR MANAGING OPTICAL POWER CONTROLS IN A C+L BAND NETWORK

CROSS REFERENCE TO RELATED APPLICATION/INCORPORATION BY REFERENCE STATEMENT

This application is a continuation and claims the benefit of U.S. patent application Ser. No. 18/152,296, which was filed on Jan. 10, 2023, titled "Coordinator for Managing Optical Power Controls in a C+L Band Network," which claims the benefit of U.S. Provisional Patent Application No. 63/298,173, which was filed on Jan. 10, 2022, titled "A Coordinator For Managing Optical Power Controls Operations In A C+L Band Network." The contents of each of the above applications are incorporated herein by reference in their entirety.

STATEMENT REGARDING FEDERALLY SPONSORED RESEARCH OR DEVELOPMENT

Not Applicable.

BACKGROUND

Dense Wavelength Division Multiplexing (DWDM) is an optical transmission technology that uses a single fiber optic line to simultaneously transport multiple optical services of different wavelengths. The different wavelengths are conventionally separated into several frequency bands, each frequency band being used as an independent channel to transport optical services of particular wavelengths. The Conventional Band (C-band) typically includes signals with wavelengths ranging from 1530 nm to 1565 nm, is the frequency band in which optical services experience the lowest amount of loss, and is the band most commonly used in DWDM. The Long-wavelength Band (L-band), which typically includes signals with wavelengths ranging from 1565 nm to 1625 nm, is the frequency band in which optical services experience the second lowest amount of loss, and is the frequency band often used when the C-band is insufficient to meet bandwidth requirements. Optical line systems that use both the C-band and the L-band are referred to as C+L or C/L optical line systems.

C+L optical line systems may be susceptible to experiencing optical power transients during loading operations due to the Stimulated Raman Scattering (SRS) effect across the different frequency bands. This can lead to traffic drop on pre-existing services in one frequency band if there is a significant loading change in the other frequency band.

SUMMARY OF THE DISCLOSURE

In C+L-band networks, services in a particular band (i.e., the C-band or the L-band) should be carefully loaded to minimize the effects of optical power changes on pre-existing services in the other band. This is due to the SRS effect. In C-band networks, services in a particular part of the spectrum may be loaded independently and without consideration for pre-existing services in another part of the spectrum. However, in C+L-band networks, an orchestrator may be desirable on top of automatic power control loops ("control blocks") controlling gain and attenuation settings in optical line system units. Such an orchestrator could load parts of a spectrum of a particular band in smaller chunks, while intermittently making corrections to account for any power changes on pre-existing services caused by the SRS effect. Once a part of the spectrum is loaded onto an outgoing transmission line of a reconfigurable optical add-drop multiplexer (ROADM), power correction requests should be issued to the control blocks before another part of the spectrum is loaded. These control blocks include the control blocks of the local ROADM where the part of the spectrum is being loaded and the immediate downstream ROADM, which may carry optically dependent pre-existing services. Managing the loading and making power corrections on the local ROADM and the immediate downstream ROADM may be performed by an orchestrator managing the control blocks of the local ROADM and the immediate downstream ROADM.

Due to the SRS effect, pre-existing services may experience a power change in response to a loading operation being performed in a part of the spectrum. Further, if the control blocks are running in an automatic fashion without any orchestration across the network, the control blocks may overcompensate for the power changes, which may lead to further power adjustments in the network, which may cause power spikes and dips which can bring down pre-existing services. To avoid this, before any loading is initiated in a ROADM, the control blocks in the local ROADM and the immediate downstream ROADM should be disabled so that the reaction to the power changes is controlled. Once the loading is complete, the control blocks in the local ROADM and the immediate downstream ROADM should be re-enabled so that corrections due to power changes, aging equipment, optical interference, etc., may be handled by the control blocks autonomously without involving the orchestrator.

To minimize effects of SRS on pre-existing services and perform the orchestration described above, the control blocks running in an automatic fashion on a local ROADM and the immediate downstream ROADM may have an orchestrator running on top of them which may perform the coordination, determine when the control blocks should be disabled and enabled on those ROADMs, and issue other power controls operation requests related to power corrections.

To mitigate the effects of optical power transients in C+L optical line systems, the present disclosure describes a coordinator which runs within the orchestrator running on top of the automatic power control loops controlling gain and attenuation settings in optical line system units. The coordinator, in various embodiments: (i) manages optical power control operations on a downstream network element when there is a loading operation being done on an upstream network element; (ii) enforces certain constraints on the loading operations in portions of the network which have an optical dependency; and (iii) sends proactive health updates from downstream network elements to upstream network elements for making loading-related decisions. In a distributed orchestration model, the orchestrator within a network element may inter-work with its peer orchestrators running on neighboring network elements to achieve network-wide orchestration. During a loading operation in the network element, the orchestrator running on that network element may perform certain power control functions on a downstream network element in order to mitigate the optical power transients caused due to the upstream loading operation. To facilitate downstream power control operation during a loading in the upstream, a specialized power control operations coordinator (PCOC) is desired which works closely within the orchestrator.

In some embodiments, the PCOC includes a processor executing processor executable logic to perform the following functionalities: (i) manage optical power control operations on a downstream network element when there is a loading being done on an upstream network element (e.g., disabling or enabling optical power controls, adjusting control of a multiplexer (MUX) WSS, and/or adjusting control of one or more optical amplifier); (ii) handle contention for loading across degrees of a node through serialization of resource acquisition requests in parts of the optical network which have an optical dependency; (iii) transmit proactive health updates from the downstream network element to the upstream network element to update the upstream network element on local resource availability and/or failure conditions).

In one aspect, the problem of facilitating downstream power control operations during an upstream loading is solved by a method, comprising: storing, by a de-multiplexer (DEMUX) module of a reconfigurable optical add-drop multiplexer (ROADM), data indicative of a current status of the ROADM, the ROADM comprising the DEMUX module and one or more multiplexer (MUX) module; receiving, by the DEMUX module, a status message from at least one of the one or more MUX module, the status message being indicative of a changed status of the at least one of the one or more MUX module; determining, by the DEMUX module, that the changed status of the at least one of the one or more MUX module is less available than the current status of the ROADM; and responsive to the determination that the changed status is less available than the current status, storing, by the DEMUX module, the changed status as the current status.

In another aspect, the problem of facilitating downstream power control operations during an upstream loading is solved by a method, comprising: receiving, by a de-multiplexer (DEMUX) module of a local reconfigurable optical add-drop multiplexer (ROADM) of an optical network, a request from an upstream ROADM, the optical network comprising a fiber optic line, the local ROADM, and the upstream ROADM, the upstream ROADM being upstream from the local ROADM on the fiber optic line, the local ROADM comprising the DEMUX module, a first multiplexer (MUX) module, and a second MUX module, the request including first instructions to perform an operation on the local ROADM; sending, by the DEMUX module, a distributed request to the first MUX module and the second MUX module, the distributed request including second instructions to perform the operation on the first MUX module and the second MUX module; attempting, by the first MUX module, to perform the operation; attempting, by the second MUX module, to perform the operation; and sending a consolidated response to the upstream ROADM, the consolidated response being indicative of one of a success and a failure of performing the operation on the first MUX module and the second MUX module.

In yet another aspect, the problem of facilitating downstream power control operations during an upstream loading is solved by an optical network, comprising: a fiber optic line; and two or more reconfigurable optical add-drop multiplexers (ROADMs), a local ROADM of the two or more ROADMs comprising one or more control block, a de-multiplexer (DEMUX) module, a first multiplexer (MUX) module, and a second MUX module, the DEMUX module comprising a DEMUX processor and a DEMUX non-transitory computer-readable medium storing DEMUX processor-executable instructions that, when executed, cause the DEMUX processor to:
  receive a request from an upstream ROADM of the two or more ROADMs, the upstream ROADM being upstream from the local ROADM on the fiber optic line, the request including first instructions to perform an operation on the local ROADM; send a distributed request to the first MUX module and the second MUX module, the distributed request including second instructions to perform the operation on the first MUX module and the second MUX module; and send a consolidated response to the upstream ROADM, the consolidated response being indicative of one of a success and a failure of performing the operation on the first MUX module and the second MUX module; and wherein the first MUX module comprises a first MUX processor and a first MUX non-transitory computer-readable medium and the second MUX module comprises a second MUX processor and a second MUX non-transitory computer-readable medium, the first MUX non-transitory computer-readable medium and the second MUX non-transitory computer-readable medium storing MUX processor-executable instructions that, when executed, cause the first MUX processor and the second MUX processor to: receive the distributed request from the DEMUX module; and attempt to perform the operation.

BRIEF DESCRIPTION OF THE DRAWINGS

The accompanying drawings, which are incorporated in and constitute a part of this specification, illustrate one or more embodiments described herein and, together with the description, explain these embodiments. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
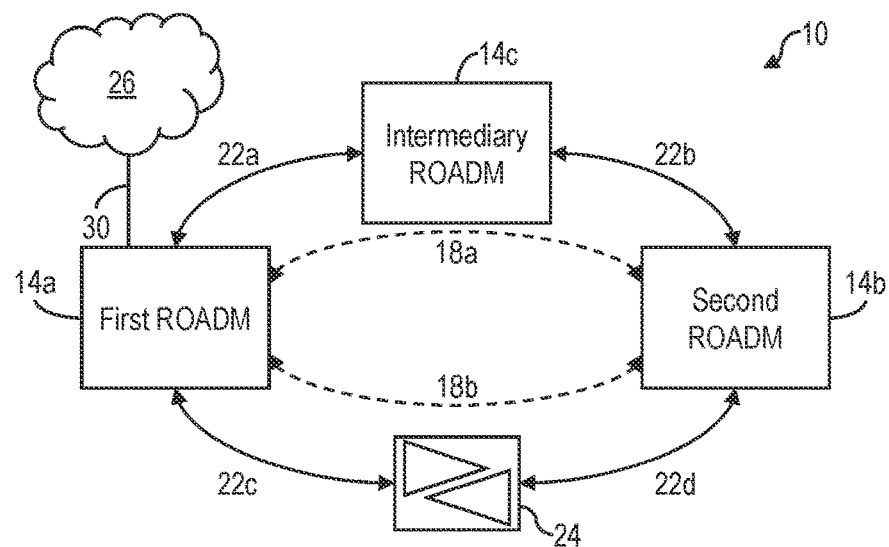
FIG. 1 is a diagram of an exemplary embodiment of a transport network constructed in accordance with the present disclosure.

Before explaining at least one embodiment of the inventive concept(s) in detail by way of exemplary language and results, it is to be understood that the inventive concept(s) is not limited in its application to the details of construction and the arrangement of the components set forth in the following description. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Headings are provided for convenience only and are not to be construed to limit the invention in any manner. Embodiments illustrated under any heading or in any portion of the disclosure may be combined with embodiments illustrated under the same or any other heading or other portion of the disclosure. Any combination of the elements described herein in all possible variations thereof is encompassed by the invention unless otherwise indicated herein or otherwise clearly contradicted by context.

Unless otherwise required by context, singular terms shall include pluralities and plural terms shall include the singular, with the exception that the term "plurality" as used herein, does not include the singular.

All patents or published patent applications referenced in any portion of this application are herein expressly incorporated by reference in their entirety to the same extent as if each individual patent or publication was specifically and individually indicated to be incorporated by reference.

All of the assemblies, systems, kits, and/or methods disclosed herein can be made and executed without undue experimentation in light of the present disclosure. Where a method claim does not specifically state in the claims or description that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." The term "plurality" refers to "two or more."

The use of the term "at least one" will be understood to include one as well as any quantity more than one. In addition, the use of the term "at least one of X, Y, and Z" will be understood to include X alone, Y alone, and Z alone, as well as any combination of X, Y, and Z.

The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), a combination of hardware and software, and/or the like. Software may include one or more computer executable instructions that when executed by one or more components cause the component to perform a specified function. It should be understood that the algorithms described herein, may be stored on one or more non-transitory computer readable medium.

Software may include one or more computer readable instruction that when executed by one or more component, e.g., a processor, causes the component to perform a specified function. It should be understood that the algorithms described herein may include multiple computer executable instructions and be stored on one or more non-transitory computer readable medium. Exemplary non-transitory computer readable mediums may include random-access memory (RAM), a read only memory (ROM), a flash memory, and/or a non-volatile memory such as, for example, a CD-ROM, a hard drive, a solid-state drive, a flash drive, a memory card, a DVD-ROM, a Blu-ray Disk, a disk, and an optical drive, combinations thereof, and/or the like. Such non-transitory computer readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

The generation of laser beams for use as optical data channel signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

As used herein, an "optical communication path" and/or an "optical route" may correspond to an optical path and/or an optical light path. For example, an optical communication path may specify a path along which light is carried between two or more network entities along a fiber optic link, e.g., an optical fiber.

The optical network has one or more band, and preferably at least two bands. A band is the complete optical spectrum carried on the optical fiber. Depending on the optical fiber used and the supported spectrum which can be carried over long distances with the current technology, relevant examples of the same are: C-Band/L-Band/Extended-C-Band. As used herein, the C-Band is a band of light having a wavelength between about 1530 nm and about 1565 nm. The L-Band is a band of light having a wavelength between about 1565 nm and about 1625 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a spectral slice (a "slice") may represent a spectrum of a particular size in a frequency band (e.g., 12.5 gigahertz ("GHz"), 6.25 GHz, 3.125 GHz, etc.). For example, a 4.8 terahertz ("THz") frequency band may include 384 spectral slices, where each spectral slice may represent 12.5 GHz of the 4.8 THz spectrum. A slice may be the resolution at which the power levels can be measured by the optical power monitoring device. The power level being measured by the optical power monitoring device represents the total optical power carried by the portion of the band represented by that slice.

Spectral loading, or channel loading, is the addition (or subtraction) of one or more channel to a specific spectrum of light described by the light's wavelength in an optical signal. When all channels within a specific spectrum are being utilized, the specific spectrum is described as fully loaded. A grouping of two or more channels may be called a channel group. Spectral loading may also be described as the addition of one or more channel group to a specific spectrum of light described by the light's wavelength to be supplied onto the optical fiber as the optical signal.

A WSS (Wavelength Selective Switch) is a component used in optical communications networks to route (switch) optical signals between optical fibers on a per-slice basis. Generally, power level controls can also be done by the WSS by specifying an attenuation level on a passband filter. A wavelength Selective Switch is a programmable device having source and destination fiber ports where the source and destination fiber ports and associated attenuation can be specified for a particular passband with a minimum bandwidth. Wavelength Selective Switches may be implemented using a variety of technologies, for example, Liquid Crystal on Silicon (LCoS), Microelectromechanical Mirrors (MEMS) arrays, etc. A WSS for the C-band and a WSS for the L-band may be implemented using the same technology or different technologies.

A passband is a portion of an optical signal the WSS passes from a source fiber port to the destination fiber port. A passband comprises one or more slice and has a passband width based on the number of slices the WSS passes from the source fiber port to the destination fiber port. As such, a minimum passband width is the same as the minimum bandwidth of the WSS.

An exemplary optical transport network consists of two distinct domains: Layer 0 ("optical domain" or "optical layer") and Layer 1 ("digital domain") data planes. Layer 0 is responsible for fixed or reconfigurable optical add/drop multiplexing (R/OADM) and optical amplification (EDFA or Raman) of optical channels and optical channel groups (OCG), typically within the 1530 nm-1565 nm range, known as C-Band, and/or typically within the 1565 nm-1625 nm range, known as L-Band. ROADM functions are facilitated via usage of a combination of colorless, directionless, and contention-less (CDC) optical devices, which may include Wavelength Selective Switches (WSS), Multicast Switches (MCS), etc. Layer 0 may include the frequency grid (for example, as defined by ITU G.694.1), ROADMs, FOADMs, Amps, MUXes, Line-system and Fiber transmission, and GMPLS Control Plane (with Optical Extensions). Layer 1 functions encompass transporting client signals (e.g., Ethernet, SONET/SDH) in a manner that preserves bit transparency, timing transparency, and delay-transparency. The predominant technology for digital layer data transport in use today is OTN (for example, as defined by ITU G.709). Layer 1 may transport "client layer" traffic. Layer 1 may be a digital layer including multiplexing and grooming. The optical layer may further be divided into either an OTS layer or an OCH layer. The OTS layer refers to the optical transport section of the optical layer, whereas the OCH layer refers to one or more optical channels which are co-routed, e.g., together as multiple channels.

Referring now to the drawings, and in particular to FIG. 1, shown therein is a diagram of an exemplary embodiment of a transport network 10 constructed in accordance with the present disclosure. The transport network 10 is depicted as comprising a plurality of network elements. In general, the network elements may be implemented in a variety of ways. Nonexclusive examples include optical line terminals (OLTs), optical cross connects (OXCs), optical line amplifiers (OAs), optical add/drop multiplexer (OADMs) and/or reconfigurable optical add/drop multiplexers (ROADMs), interconnected by way of intermediate links. OLTs may be used at either end of a connection or intermediate link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety.

As shown in FIG. 1, the network elements may include, for example, a plurality of ROADMs 14a-n, such as a first ROADM 14a, a second ROADM 14b, and an intermediary ROADM 14c, and one or more optical amplifier (OA) 24. Data transmitted within the transport network 10 from the first ROADM 14a to the second ROADM 14b may travel along a first optical path 18a formed by a first fiber optic line 22a, the intermediary ROADM 14c, and a second fiber optic line 22b to the second ROADM 14b, or the data may travel along a second optical path 18b formed by a third fiber optic line 22c, the OA 24, and a fourth fiber optic line 22d.

In some embodiments, a user may interact with a computer system 26 (e.g., via a user device (not shown)) that may be used to communicate with one or more of the ROADMs 14a-n (hereinafter "ROADM(s) 14") via a communication network 30. In some embodiments, the computer system 26 (described in more detail below in reference to FIG. 2) may comprise a processor and a memory comprising a data store that may store data such as version information, firmware version information, sensor data, system data, metrics, logs, tracing, and the like in a raw format as well as transformed data that may be used for tasks such as reporting, visualization, analytics etc. The data store may include structured data from relational databases, semi-structured data, unstructured data, time-series data, and binary data. The data store may be a data base, a remote accessible storage, or a distributed filesystem. In some embodiments, the data store may be a component of an enterprise network.

In some embodiments, the computer system 26 is connected to one or more of the ROADMs 14 via the communication network 30. In this way, the computer system 26 may communicate with each of the ROADMs 14, and may, via the communication network 30, transmit or receive data from each of the ROADMs 14. In other embodiments, the computer system 26 may be integrated into each of the ROADMs 14 and/or may communicate with one or more pluggable card within each of the ROADMs 14. In some embodiments, the computer system 26 may be integrated within one of the pluggable cards of the ROADM 14 itself. In some embodiments, the computer system 26 may be a remote network element.

The communication network 30 may be almost any type of network. For example, in some embodiments, the communication network 30 may be a version of an Internet network (e.g., a TCP/IP-based network). In some embodiments, the communication network 30 is the Internet. It should be noted, however, that the communication network 30 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

If the communication network 30 is the Internet, a primary user interface of the computer system 26 may be delivered through a series of web pages or private internal web pages of a company or corporation, which may be written in hypertext markup language, JavaScript, or the like, and accessible by the user. It should be noted that the primary user interface of the computer system 26 may be another type of interface including, but not limited to, a Windows-based application, a tablet-based application, a mobile web interface, a VR-based application, an application running on a mobile device, and/or the like. In one embodiment, the communication network 30 may be connected to one or more of the user device, the computer system 26, the OAs 24, and the ROADMs 14.

The transport network 10 may be considered as a graph made up of interconnected individual network elements (i.e., the ROADMs 14 and the OAs 24). The transport network 10 may include any type of network that uses light as a transmission medium. For example, the transport network 10 may include a fiber-optic based network, an optical transport network, a light-emitting diode network, a laser diode network, an infrared network, a wireless optical network, a wireless network, combinations thereof, and/or other types of optical networks.

The optical signals carried on the fiber optic lines 22 may deteriorate as they travel over long distances. Accordingly, the OAs 24 may be operable to amplify the optical signals carried on the fiber optic lines 22 in substantially all of the C- and L-bands. Each of the OAs 24 may be, for example, an Erbium-Doped Fiber Amplifier (EDFA) or a Raman amplifier. The OAs 24 may further contain VOAs (not shown) through which the power levels may be controlled. The amplifier gain itself may be adjustable by a link control block (to be discussed further below in reference to FIG. 5).

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the transport network 10 may perform one or more functions described as being performed by another one or more of the devices of the transport network 10. Devices of the computer system 26 may interconnect via wired connections, wireless connections, or a combination thereof. For example, in one embodiment, the user device (not shown) and the computer system 26 may be integrated into the same device, that is, the user device (not shown) may perform functions and/or processes described as being performed by the computer system 26, described below in more detail.

Figure 2:
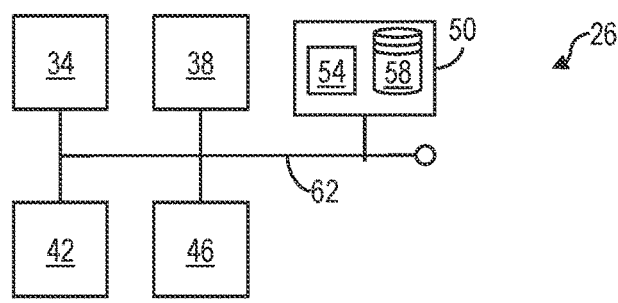
FIG. 2 is a block diagram of a computer system shown in FIG. 1.

Referring now to FIG. 2, shown therein is a diagram of an exemplary embodiment of the computer system 26 shown in FIG. 1. The computer system 26 may include, but is not limited to, embodiments as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the computer system 26 may include one or more input device 34 (hereinafter "input device 34"), one or more output device 38 (hereinafter "output device 38"), one or more processor 42 (hereinafter "processor 42"), one or more communication device 46 (hereinafter "communication device 46") capable of interfacing with the communication network 30, one or more non-transitory computer readable medium 50 (hereinafter "memory 50") storing processor-executable code 54 (hereinafter, the "software applications 54") and a database 58, for example including, a web browser capable of accessing a website and/or communicating information and/or data over a wireless or wired network (e.g., the communication network 30), and/or the like. The software applications 54, when executed by the processor 42, may cause the processor 42 to perform one or more of the methods described herein. The input device 34, the output device 38, the processor 42, the communication device 46, and the memory 50 may be connected via a path 62 such as a data bus that permits communication among the components of the computer system 26.

In some embodiments, the processor 42 may comprise one or more processor 42 working together, or independently, to read and/or execute processor executable code and/or data, such as stored in the memory 50. The processor 42 may be capable of creating, manipulating, retrieving, altering, and/or storing data structures into the memory 50. Each element of the computer system 26 may be partially or completely network-based or cloud-based, and may or may not be located in a single physical location.

Exemplary embodiments of the processor 42 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 42 may be capable of communicating with the memory 50 via the path 62 (e.g., data bus). The processor 42 may be capable of communicating with the input device 34 and/or the output device 38.

The processor 42 may be further capable of interfacing and/or communicating with the network elements (e.g., the ROADMs 14 and/or the OAs 24) via the communication network 30 using the communication device 46. For example, the processor 42 may be capable of communicating via the communication network 30 by exchanging signals (e.g., analog, digital, optical, and/or the like) via one or more ports (e.g., physical or virtual ports) using a network protocol to provide information to the network elements (e.g., the ROADMs 14 and/or the OAs 24).

The memory 50 may store software applications 54 that, when executed by the processor 42, causes the computer system 26 to perform an action such as communicate with or control one or more component of the computer system 26, the transport network 10 (e.g., the ROADMs 14 and/or the OAs 24) and/or the communication network 30.

In some embodiments, the memory 50 may be located in the same physical location as the computer system 26, and/or one or more memory 50 may be located remotely from the computer system 26. For example, the memory 50 may be located remotely from the computer system 26 and communicate with the processor 42 via the communication network 30. Additionally, when more than one memory 50 is used, a first server memory 50 may be located in the same physical location as the processor 42, and additional server memory 50 may be located in a location physically remote from the processor 42. Additionally, the memory 50 may be implemented as a "cloud" non-transitory computer readable storage memory (i.e., one or more memory 50 may be partially or completely based on or accessed using the communication network 30).

The input device 34 may be capable of receiving information input from the user, another computer, and/or the processor 42, and transmitting such information to other components of the computer system 26 and/or the communication network 30. The input device 34 may include, but is not limited to, embodiment as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 38 may be capable of outputting information in a form perceivable by the user, another computer system, and/or the processor 42. For example, embodiments of the output device 38 may include, but are not limited to, a computer monitor, a screen, a touchscreen, a speaker, a website, a television set, a smart phone, a PDA, a cell phone, a fax machine, a printer, a laptop computer, a haptic feedback generator, a network interface, combinations thereof, and/or the like, for example. In some embodiments, the input device 34 and the output device 38 may be implemented as a single device, such as, for example, a touchscreen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

The communication network 30 may permit bi-directional communication of information and/or data between the computer system 26 and/or the network elements (e.g., the ROADMs 14 and/or the OAs 24) of the transport network 10. The communication network 30 may interface with the computer system 26 and/or the network elements (e.g., the ROADMs 14 and/or the OAs 24) in a variety of ways. For example, in some embodiments, the communication network 30 may interface by optical and/or electronic interfaces, and/or may use a plurality of network topographies and/or protocols including, but not limited to, Ethernet, TCP/IP, circuit switched path, combinations thereof, and/or the like. The communication network 30 may utilize a variety of network protocols to permit bi-directional interface and/or communication of data and/or information between the computer system 26 and/or the network elements (e.g., the ROADMs 14 and/or the OAs 24).

In some embodiments, the database 58 is a time-series database, a relational database, or a non-relational database. Examples of such databases include DB2®, Microsoft® Access, Microsoft® SQL Server, Oracle®, MySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The database 58 may be centralized or distributed across multiple systems.

Figure 3A:
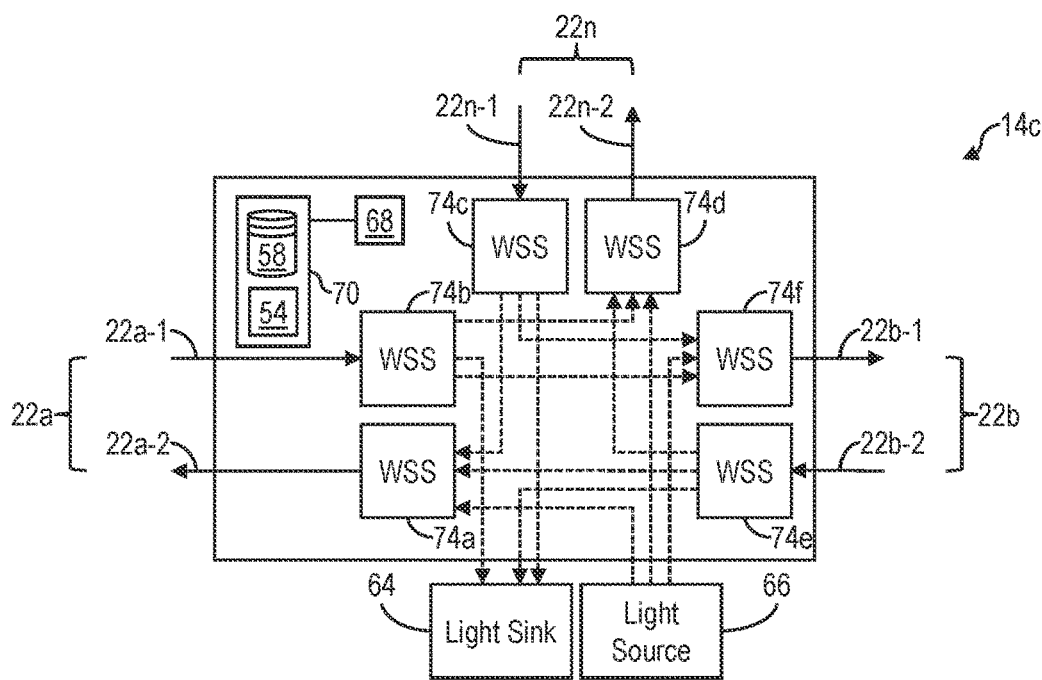
FIG. 3A is a block diagram of an intermediary ROADM shown in FIG. 1.

Referring now to FIG. 3A, shown therein is a diagram of the intermediary ROADM 14*c* shown in FIG. 1. In general, the ROADMs 14 transmit and receive data traffic and control signals. FIG. 3A illustrates an example of the intermediary ROADM 14*c* being a ROADM 14 that interconnects the first fiber optic line 22*a* and the second fiber optic line 22*b*, as well as an nth fiber optic line 22*n*. The first ROADM 14*a* and the second ROADM 14*b* may be similar in construction and function as the intermediary ROADM 14*c*. For this reason, only the intermediary ROADM 14*c* will be described herein for purposes of brevity.

Each of the first fiber optic line 22*a* (shown herein as a first optical fiber line 22*a*-1 and a second optical fiber line 22*a*-2), the second fiber optic line 22*b* (shown herein as a first optical fiber line 22*b*-1 and a second optical fiber line 22*b*-2), and the nth fiber optic line 22*n* (shown herein as a first optical fiber line 22*n*-1 and a second optical fiber line 22*n*-2) may include optical fiber pairs, wherein each optical fiber of the pair carries optical signal groups propagating in opposite directions. As seen in FIG. 3A, for example, the first fiber optic line 22*a* includes the first optical fiber line 22*a*-1, which carries optical signals toward the intermediary ROADM 14*c*, and the second optical fiber line 22*a*-2 that carries optical signals output from the intermediary ROADM 14*c*. Similarly, the nth fiber optic line 22*n* may include the first optical fiber line 22*n*-1 and the second optical fiber line 22*n*-2 carrying optical signal groups to and from the intermediary ROADM 14*c*, respectively. Further, the second fiber optic line 22*b* may include the first optical fiber line 22*b*-1 and the second optical fiber line 22*b*-2 also carrying optical signals from and to the intermediary ROADM 14*c*, respectively. Additional network elements, not shown in FIG. 3A, may be provided that supply optical signal groups to and receive optical signal groups from the intermediary ROADM 14*c*. Such network elements may comprise a ROADM 14 having the same or similar structure as that of the intermediary ROADM 14*c*, or may comprise an OA 24.

As shown in FIG. 3A, a light sink 64 (described in more detail below in reference to FIG. 3B) and a light source 66 (described in more detail below in reference to FIG. 3C) may be provided and in communication with the intermediary ROADM 14*c* to drop and add optical signal groups, respectively. As further shown in FIG. 3A, the intermediary ROADM 14*c* may include a plurality of WSS modules 74, such as WSS modules 74*a-f*. Wavelength selective switches are known components that can dynamically route, block and/or attenuate received optical signal groups input from and output to the fiber optic lines 22*a-n*. In addition to transmitting/receiving optical signal groups from these network elements, optical signal groups may also be input from or output to the light source 66 and the light sink 64, respectively.

As further shown in FIG. 3A, each of the WSS modules 74a-f can receive optical signal groups and selectively direct such optical signal groups to other WSS modules 74a-f for output from the intermediary ROADM 14c. For example, the WSS module 74b may receive optical signal groups on the first optical fiber line 22a-1 and supply certain optical signal groups to the WSS module 74f, while others are supplied to the WSS module 74d. Those supplied to the WSS module 74f may be output to a downstream network element, such as the second ROADM 14b (shown in FIG. 1) on the first optical fiber line 22b-1, while those supplied to WSS module 74d may be output to another network element (e.g., a ROADM 14 and/or an OA 24) (not shown) on the second optical fiber line 22n-2. Also, optical signal groups input to the intermediary ROADM 14c on the second optical fiber line 22b-2 may be supplied by WSS module 74e to either WSS module 74a and on to the first ROADM 14a via the second optical fiber line 22a-2 or WSS module 74d and on to another network element (e.g., a ROADM 14 and/or an OA 24) (not shown) via the second optical fiber line 22n-2. Moreover, WSS module 74c may selectively direct optical signal groups input to the intermediary ROADM 14c from the first optical fiber line 22n-1 to either WSS module 74a and onto the first ROADM 14a via the second optical fiber line 22a-2 or to WSS module 74f and onto the second ROADM 14b via the first optical fiber line 22b-1.

WSS modules 74b, 74c, and 74e may also selectively or controllably supply optical signal groups to the light sink 64 and optical signal groups may be selectively output from the light source 66 to the intermediary ROADM 14c. The optical signal groups output from the light source 66 may be selectively supplied to one or more of WSS modules 74a, 74d, and 74f, for output on to the second optical fiber line 22a-2, the second optical fiber line 22n-2, and the first optical fiber line 22b-1, respectively.

As further shown in FIG. 3A, in some embodiments, the intermediary ROADM 14c further comprises a processor 68 and a memory 70 (i.e., a non-transitory computer readable medium) storing the software applications 54 and the database 58. The processor 68 and the memory 70 may be similar in construction and function as the processor 42 and the memory 50, respectively.

Figure 3B:
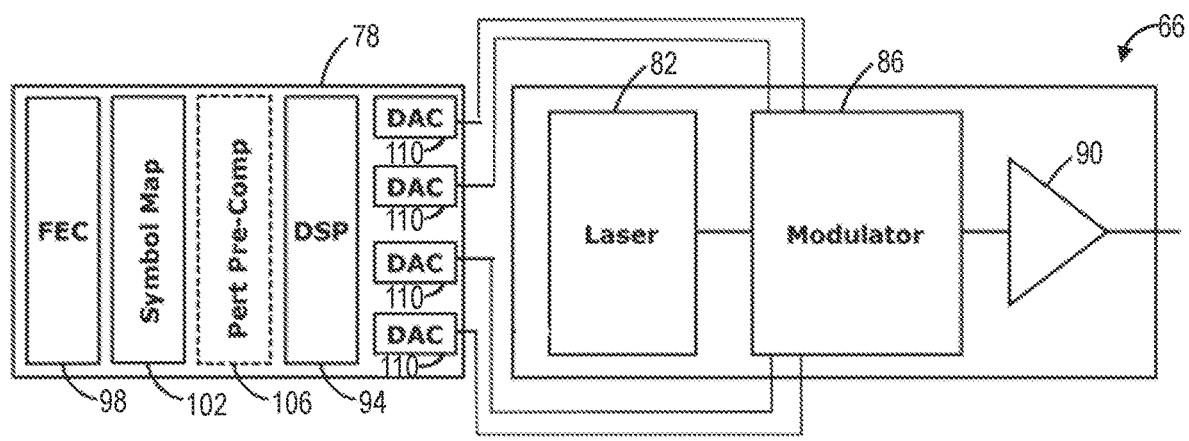
FIG. 3B is a block diagram of a light source shown in FIG. 3A.

Referring now to FIG. 3B, shown therein is an exemplary embodiment of the light source 66 shown in FIG. 3A. The light source 66 may comprise one or more transmitter digital signal processor circuit 78, one or more laser 82, one or more modulator 86, one or more semiconductor optical amplifier 90, and/or other components (not shown). In some embodiments, the light source is a coherent transmitter.

The transmitter digital signal processor circuit 78 may have one or more transmitter digital signal processor (DSP) 94, Transmitter Forward Error Correction (FEC) circuitry 98, Symbol Map circuitry 102, transmitter perturbative pre-compensation circuitry 106, and digital-to-analogue converters (DAC) 110. The transmitter digital signal processor circuit 78 may be located in any one or more components of the light source 66, or separate from the components, and/or in any location(s) among the components. The transmitter digital signal processor circuit 78 may be in the form of one or more Application Specific Integrated Circuit (ASIC), which may contain one or more module and/or custom module.

Processed electrical outputs from the transmitter digital signal processor circuit 78 may be supplied to the modulator 86 for encoding data into optical signals generated and supplied to the modulator 86 from the laser 82. The semiconductor optical amplifier 90 receives, amplifies, and transmits the optical signal including encoded data in the spectrum. Processed electrical outputs from the transmitter digital signal processor circuit 78 may be supplied to other circuitry in the transmitter digital signal processor circuit 78, for example, clock and data modification circuitry. The laser 82, modulator 86, and/or semiconductor optical amplifier 90 may be coupled with a tuning element (e.g., a heater) (not shown) that can be used to tune the wavelength of an optical signal channel output by the laser 82, modulator 86, or semiconductor optical amplifier 90. In some embodiments, a single laser 82 may be shared by multiple light sources 66.

Other possible components in the light source 66 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. Optical transmitters are further described in U.S. Patent Publication No. 2012/0082453, the contents of which is hereby incorporated by reference in its entirety.

Figure 3C:
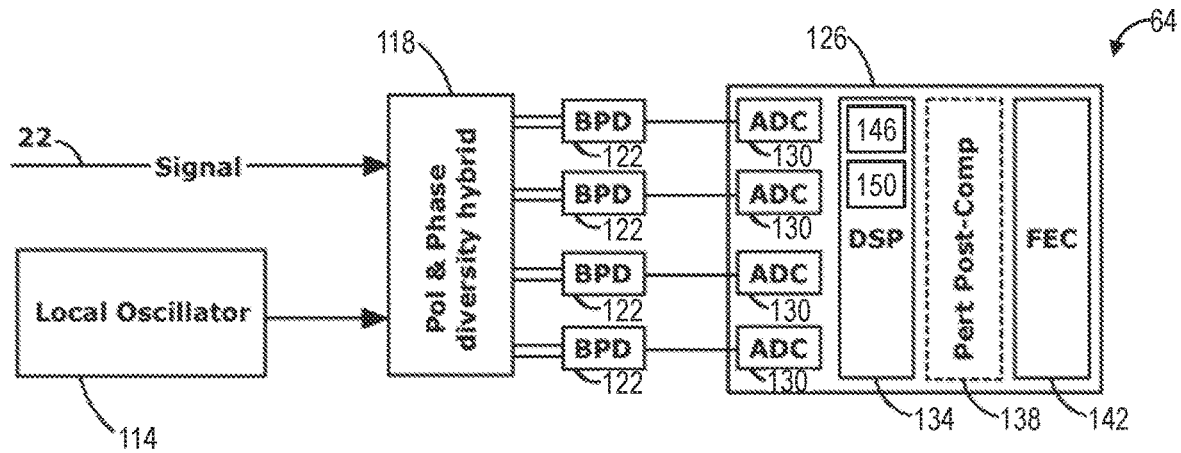
FIG. 3C is a block diagram of a light sink shown in FIG. 3A.

Referring now to FIG. 3C, shown therein is an exemplary embodiment of the light sink 64 shown in FIG. 3A. The light sink 64 may comprise one or more local oscillator 114, a polarization and phase diversity hybrid circuit 118 receiving the one or more channel on the spectrum and the input from the local oscillator 114, one or more balanced photodiode 122 that produces electrical signals representative of the one or more channel on the spectrum, and one or more receiver processor circuit 126. Other possible components in the light sink 64 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. In some embodiments, the light sink 64 is a coherent receiver. The light sink 64 may be implemented in other ways, as is well-known in the art. Exemplary embodiments of the light sink 64 (particularly where the light sink 64 is a coherent receiver) are further described in U.S. patent application Ser. No. 12/052,541, titled "Coherent Optical Receiver".

The one or more receiver processor circuit 126 may comprise one or more analog-to-digital converter (ADC) 130 receiving the electrical signals from the balanced photodiodes 122, one or more receiver digital signal processor (DSP) 134, receiver perturbative post-compensation circuitry 138, and receiver forward error correction (FEC) circuitry 142. The receiver FEC circuitry 142 may apply corrections to the data, as is well-known in the art. The one or more receiver processor circuit 126 and/or the one or more receiver DSP 134 may be located on one or more component of the light sink 64 or separately from the components, and/or in any location(s) among the components. The receiver processor circuit 126 may be in the form of an Application Specific Integrated Circuit (ASIC), which may contain one or more module and/or custom module. In one embodiment, the receiver DSP 134 may include, or be in communication with, one or more processor 146 and one or more memory 150 storing processor readable instructions, such as software, or may be in communication with the processor 42 and the memory 50.

The one or more receiver DSP 134 receives and processes the electrical signals with multi-input-multiple-output (MIMO) circuitry, as described, for example, in U.S. Pat. No. 8,014,686, titled "Polarization demultiplexing optical receiver using polarization oversampling and electronic polarization tracking". Processed electrical outputs from receiver DSP 134 may be supplied to other circuitry in the receiver processor circuit 126, such as the receiver perturbative post-compensation circuitry 138 and the receiver FEC circuitry 142. Various components of the light sink 64 may be provided or integrated, in one example, on a common substrate. Further integration is achieved by incorporating various optical de-multiplexer designs that are relatively compact and conserve space on the surface of the substrate.

In use, the one or more channel of the spectrum may be subjected to optical nonlinear effects between the light source 66 and the light sink 64 such that the spectrum received does not accurately convey carried data in the form that the spectrum was transmitted. The impact of optical nonlinear effects can be partially mitigated by applying perturbative distortion algorithms using one or more of the transmitter perturbative pre-compensation circuitry 106 and the receiver perturbative post-compensation circuitry 138. The amount of perturbation may be calculated using coefficients in algorithms and known or recovered transmitted data. The coefficients may be calculated, in accordance with U.S. Pat. No. 9,154,258 entitled "Subsea Optical Communication System Dual Polarization Idler" the contents of which are hereby incorporated by reference in its entirety, by use of analysis of one or more incoming channel at the light sink 64.

Figure 3D:
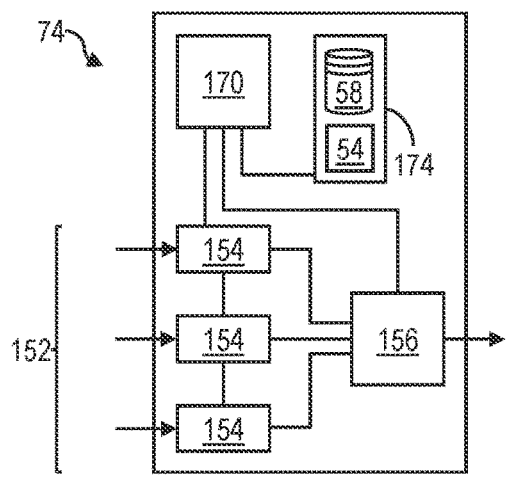
FIG. 3D is a block diagram of a wavelength-selective switch module shown in FIG. 3A.

Referring now to FIG. 3D, shown therein is a diagram of the WSS module 74 (i.e., any of the WSS modules 74a-f) shown in FIG. 3A. The WSS module 74 may comprise a WSS 152 comprising a plurality of tributary ports 154 and a line port 156. Although three tributary ports 154 and one line port 156 are shown in FIG. 3D, persons having ordinary skill in the art will understand that the WSS 152 may have other numbers of tributary ports 154 and line ports 156. The WSS module 74 may be operable to receive a plurality of passbands at the tributary ports 154 of the WSS 152, multiplex the passbands, and transmit the passbands at the line port 156 of the WSS 152. The WSS module 74 in this configuration (i.e., where the tributary ports 154 are inputs and the line port 156 is an output) may be referred to as a multiplexer (MUX) module 158. The WSS module 74 also may be operable to receive a plurality of passbands at the line port 156 of the WSS 152, de-multiplex the passbands, and transmit the passbands at the tributary ports 154 of the WSS 152. The WSS module 74 in this configuration (i.e., where the line port 156 is an input and the tributary ports 154 are outputs) may be referred to as a de-multiplexer (DE-MUX) module 160. In some embodiments, each of the WSS modules 74 is further operable to apply variable attenuation for each of the passbands so that power levels may be changed at the outgoing port (i.e., the line port 156 for the MUX modules 158 and the tributary ports 154 for the DEMUX modules 160) for the passbands.

In some embodiments, each of the WSS modules 74 also may be operable to control the attenuation for each of the passbands. Such variable power adjustable functionality may be advantageous to permit flexibility in adapting to changes in the optical characteristics of the transport network 10 (e.g., loss in fiber, equipment aging, optical interference, configuration changes, etc.). Generally, each of the MUX modules 158 and DEMUX modules 160 comprise the same type of optical element (e.g., the WSS 152). However, persons having ordinary skill in the art will understand that the MUX modules 158 and the DEMUX modules 160 may comprise different types of optical elements. The multiplexing and de-multiplexing functionality of the WSSs 152 may be implemented using a variety of technologies, such as LCoS, MEMS arrays, etc.

Each of the WSS modules 74 may further comprise a processor 170 and a memory 174 storing the software applications 54 and the database 58. The processor 170 and the memory 174 may be similar in construction and function as the processors 42, 68, and the memories 50, 70, respectively. Each of the MUX modules 158 may optionally comprise an OA 24 which may be used to boost the power of the optical signal as it is ejected from the outgoing port of the MUX module 158 (i.e., the line port 156 of the WSS 152). Each of the DEMUX modules 160 may optionally comprise an OA 24 which may be used to boost the power of the optical signal which is received at the input port of the DEMUX module 160 (i.e., the line port 156 of the WSS 152).

Figure 4:
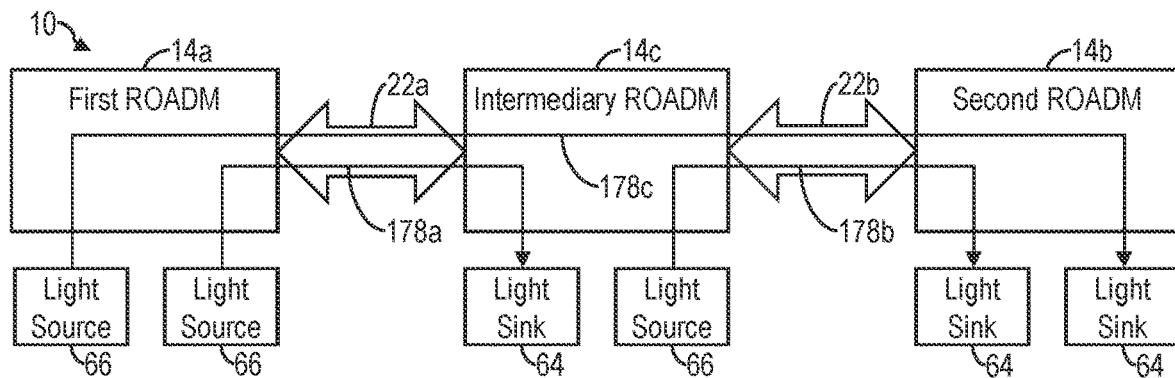
FIG. 4 is another block diagram of the transport network shown in FIG. 1.

Referring now to FIG. 4, shown therein is another diagram of the transport network 10 shown in FIG. 1. FIG. 4 illustrates the concept of optical dependency between optical services 178 as defined herein. Optical services 178a-n are said to be "optically dependent" if the optical services 178a-n share a common fiber optic line 22. If two optical services 178 are optically dependent and belong to different bands, then a power variation applied to one of the optical services 178 may cause power transients to be experienced by the other optical service 178 due to the SRS effect discussed above. Similarly, fiber optic lines 22a-n are said to be optically dependent if the fiber optic lines 22a-n share at least one optical service 178 between them that is activated on each of the fiber optic lines 22a-n. If the at least one optical service 178 is shared between the fiber optic lines 22a-n, but is only activated on one fiber optic line 22, then the two fiber optic lines 22a-n are not said to be optically dependent.

FIG. 4 illustrates a first optical service 178a being added by the first ROADM 14a, transported on the first fiber optic line 22a, and dropped by the intermediary ROADM 14c; a second optical service 178b being added by the intermediary ROADM 14c, transported on a second fiber optic line 22b, and dropped by the second ROADM 14b; and a third optical service 178c being added by the first ROADM 14a, transported on the first fiber optic line 22a and the second fiber optic line 22b, and dropped by the second ROADM 14b. In this configuration, the first optical service 178a and the third optical service 178c are optically dependent, and the second optical service 178b and the third optical service 178c are optically dependent, but the first optical service 178a and the second optical service 178b are not optically dependent, because they are not transported on the same fiber optic line 22 at any point. Further, the first fiber optic line 22a and the second fiber optic line 22b would be optically dependent if the third optical service 178c were activated on both of the first fiber optic line 22a and the second fiber optic line 22b, but the first fiber optic line 22a and the second fiber optic line 22b would not be optically dependent if the third optical service 178c were not activated on both of the first fiber optic line 22a and the second fiber optic line 22b.

Figure 5:
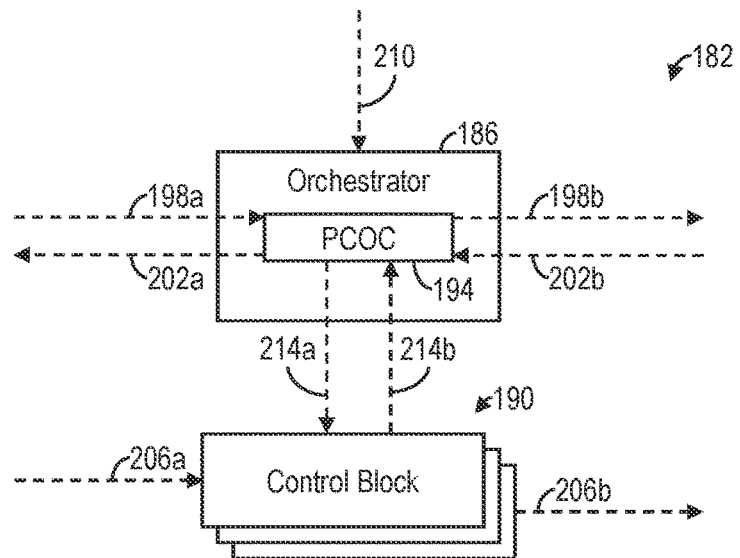
FIG. 5 is a block diagram of an exemplary embodiment of a software system constructed in accordance with the present disclosure.

Referring now to FIG. 5, shown therein is a diagram of a software system 182 constructed in accordance with the present disclosure. In some embodiments, as shown in FIG. 5, the software system 182 comprises the software applications 54 shown in FIGS. 2, 3A, and 3D, each of the software applications 54 being operable to perform an action such as communicate with or control one or more component of the computer system 26, the transport network 10 (e.g., the ROADMs 14 and/or the OAs 24) and/or the communication network 30.

In particular, the software applications 54 may comprise an orchestrator application 186 (hereinafter, the "orchestrator 186") and one or more optical power control loop 190 (hereinafter, the "control block(s) 190"). The control blocks 190 may be operable to control one or more optical power control-related configuration of the transport network 10 (e.g., the ROADMs 14 and/or the OAs 24) (i.e., by adjusting one or more attenuation level and/or one or more gain associated with the ROADMs 14 and/or the OAs 24) such that a target optical power level in the fiber optic line 22 is maintained within a tolerance level of optimal levels all of the time. Maintaining such a target optical power level may have the effect of guaranteeing that receiving equipment (i.e., a light sink 64 of one of the ROADMs 14) receives a higher-quality signal with a good Signal-to-Noise Ratio (SNR) and with minimal distortion. In some embodiments, the orchestrator 186 is operable to control one or more optical power control-related configuration of the ROADMs 14 and/or the control blocks 190 thereof. Exemplary orchestrators 186 may include, for example, the Service and Power Control Orchestrator disclosed in U.S. Patent Application No. 63/305,779, which is incorporated herein by reference.

The control blocks 190 may comprise at least one of a MUX control block 190 operable to control one or more optical power control-related configuration of a MUX WSS 152 (i.e., a WSS 152 of a MUX module 158 in the configuration where the tributary ports 154 are inputs and the line port 156 is an output), a DEMUX control block 190 operable to control one or more optical power control-related configuration of a DEMUX WSS 152 (i.e., a WSS 152 of a DEMUX module 160 in the configuration where the line port 156 is an input and the tributary ports 154 are outputs), and/or a link control block 190 operable to control one or more optical power control-related configuration of one or more OA 24 in the transport network 10. The MUX control block 190 may adjust one or more passband configuration and/or one or more attenuation of the "MUX" WSSs 152. Such adjustments may be made by the MUX control block 190 on a per-passband basis. The DEMUX control block 190 may adjust one or more passband configuration and/or one or more attenuation of the "DEMUX" WSSs 152. Such adjustments may be made by the DEMUX control block 190 on a per-passband basis. In some embodiments, the functions of the MUX control block 190 and the DEMUX control block 190 may be performed by a single WSS control block 190. The link control block 190 may adjust one or more configuration, one or more attenuation, and/or one or more gain for the OAs 24 in the transport network 10. Such adjustments may be made on a per-band basis (i.e., the C-band, the L-band, or C/L-band).

In some embodiments, the orchestrator 186 is operable to control one or more optical power control-related configuration of the ROADM 14 and/or the control blocks 190 thereof. Further, the orchestrator 186 may comprise a power control operations coordinator (PCOC) 194, which may be operable to determine whether and when the control blocks 190 should be disabled and/or enabled, and/or issue other power controls operation (PCO) requests 198 related to such operations. Such orchestration may have the effect of minimizing the impact the SRS effect has on pre-existing services in the transport network 10.

In some embodiments, particularly in those embodiments in which the transport network 10 comprises a plurality of distributed orchestrators 186 (and, therefore, a plurality of distributed PCOCs 194), the PCOC 194 may receive upstream PCO requests 198a from an upstream PCOC 194 and may transmit downstream PCO requests 198b to a downstream PCOC 194. Similarly, the PCOC 194 may transmit upstream PCO responses and/or health updates 202a to an upstream PCOC 194 and may receive downstream PCO responses and/or health updates 202b from a downstream PCOC 194. The control block(s) 190 may receive upstream controls data 206a from the control block(s) 190 of an upstream ROADM 14 and may transmit downstream controls data 206b to the control block(s) 190 of a downstream ROADM 14. The orchestrator 186 may receive service control requests and/or configuration information 210 from a northbound layer.

In some embodiments, the PCOC 194 may transmit PCO requests 214a to the control block(s) 190 and may receive PCO responses and/or health updates 214b from the control block(s).

The PCOC 194 may be operable to manage optical power control operations on a downstream ROADM 14 (e.g., the second ROADM 14b in FIG. 4) when there is a loading in progress on a local ROADM 14 (e.g., the intermediary ROADM 14c in FIG. 4, depicted as loading the second optical service 178b onto the second fiber optic line 22b); handle contention for loading services across the degrees of a ROADM 14 via a serialization of resource acquisition requests in parts of the ROADM 14 that have an optical dependency with the loaded services; and proactively communicate status messages from a downstream ROADM 14 (e.g., the second ROADM 14b in FIG. 4) to an upstream ROADM 14 (e.g., the intermediary ROADM 14c shown in FIG. 4), the status messages being indicative of a health status of the downstream ROADM 14 (e.g., local resource availability for the downstream ROADM 14 and/or failure conditions of the downstream ROADM 14).

As discussed further below, the downstream PCO requests 198b may include disable-adjust requests, which may include instructions to reserve a downstream ROADM 14 (e.g., the intermediary ROADM 14c in FIG. 4) for a loading of an optical service 178 (e.g., the third optical service 178c in FIG. 4) on a fiber optic line 22 (e.g., the first fiber optic line 22a in FIG. 4) by preventing the downstream ROADM 14 from loading another optical service 178 (e.g., the second optical service 178b in FIG. 4) on another fiber optic line 22 (e.g., the second fiber optic line 22b in FIG. 4) and disabling associated control blocks 190 of the downstream ROADM 14, thereby preventing the associated control blocks 190 from adjusting the configuration of the downstream ROADM 14. Additionally, as discussed further below, the downstream PCO responses and/or health updates 202b may include disable-adjust responses, which may be indicative of one of a success and a failure of reserving the downstream ROADM 14.

Figure 6:
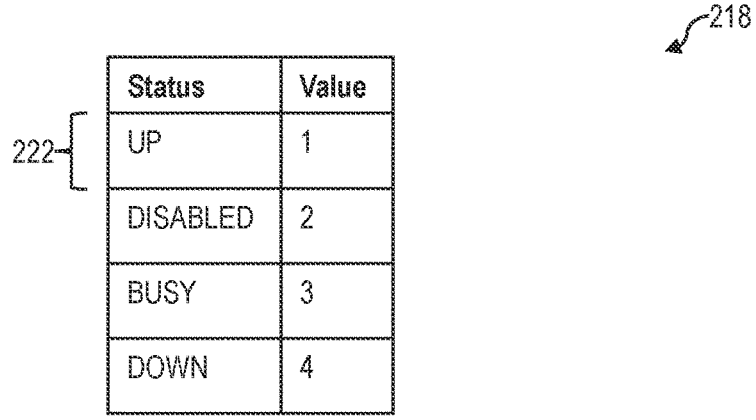
FIG. 6 is an exemplary embodiment of a status table constructed in accordance with the present disclosure.

Referring now to FIG. 6, shown therein is an exemplary embodiment of a status table 218 constructed in accordance with the present disclosure. The status table 218 may be stored in the database 58 or otherwise in one of the memories 50, 70, 174, and may comprise health status entries 222 for each of the health statuses described herein. The status table may comprise a "Code" column and a "Value" column, in which are stored a health status code of the health status entry 222 and a health status value of the health status entry 222, respectively.

An "UP" (i.e., available) health status may have a health status value of 1 and may indicate that the consolidated health status of a transmitting ROADM 14 (i.e., the ROADM 14 that generated the status message) is good. That is, there is no local loading operation in-progress on any of the optically dependent MUX modules 158 of the transmitting ROADM 14, none of the optically dependent MUX modules 158 of the transmitting ROADM 14 have been disabled for a loading operation being done on an upstream ROADM 14, none of the optically dependent MUX modules 158 of the transmitting ROADM 14 are down due to an issue with a control block 190 of any of the optically dependent MUX modules 158 or an issue related to the software applications 54 being uninitialized, and connectivity of the control plane is up between a transmitting DEMUX module 160 (i.e., the DEMUX module 160 from which the status message was transmitted) and connected optically dependent MUX modules 158 (i.e., MUX modules 158 of the same ROADM 14 as the transmitting DEMUX module 160). The concept of optically dependent MUX modules 158 is further discussed below in reference to FIG. 7A.

A "DISABLED" (i.e., reserved) health status may have a health status value of 2 and may indicate that one of the optically dependent MUX modules 158 of the transmitting ROADM 14 has been disabled for a loading operation being done on the reserving ROADM 14 (i.e., the ROADM 14 that sent a disable-adjust request to the transmitting ROADM 14 and received a disable-adjust response indicative of a success of reserving the transmitting ROADM 14) which is the receiving ROADM 14.

A "BUSY" health status may have a health status value of 3 and may indicate that one or more of the optically dependent MUX modules 158 of the transmitting ROADM 14 has a local loading operation in-progress or has been disabled for a loading operation being done on a reserving ROADM 14 that is not the receiving ROADM 14. That is, if the receiving ROADM 14 is upstream from the transmitting ROADM 14 on a first fiber optic line 22, the reserving ROADM 14 is upstream from the transmitting ROADM 14 on a second fiber optic line 22.

Finally, a "DOWN" health status may have a health status value of 4 and may indicate that the consolidated health of the transmitting ROADM 14 is not good. That is, one or more of the optically dependent MUX modules 158 of the transmitting ROADM 14 is down due to an unavailability of power controls, a failure of a control block 190 of one or more of the optically dependent MUX modules 158, or an issue related to the software applications 54 being uninitialized, or a transmitting DEMUX module 160 is unable to connect with one or more of the optically dependent MUX modules 158 due to an issue with the control plane.

Where a particular health status is referred to as "less available" or "more available" than another health status, it may indicate that the "less available" status has a higher health status value than the "more available" status. That is, a transmitting ROADM 14 with an "UP" health status (i.e., a health status value of 1) may be more available than a transmitting ROADM 14 with a "DISABLED" health status (i.e., a health status value of 2), which may be more available than a transmitting ROADM 14 with a "BUSY" health status (i.e., a health status value of 3), which may be more available than a "DOWN" health status (i.e., a health status value of 4).

Figure 7A:
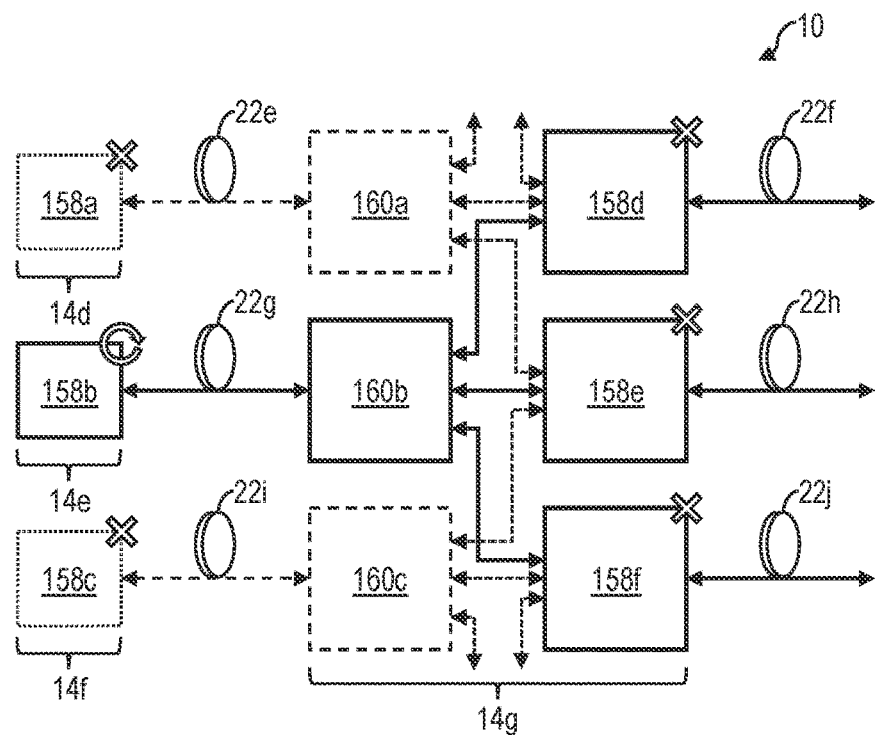
FIG. 7A is a block diagram of another exemplary embodiment of a transport network constructed in accordance with the present disclosure.

Referring now to FIG. 7A, shown therein is a diagram of another exemplary embodiment of the transport network 10 constructed in accordance with the present disclosure. The transport network 10 may comprise one or more fiber optic line 22 (e.g., a first fiber optic line 22e, a second fiber optic line 22f, a third fiber optic line 22g, a fourth fiber optic line 22h, a fifth fiber optic line 22i, and a sixth fiber optic line 22j) and two or more ROADMs 14. As shown in FIG. 7A, the two or more ROADMs 14 may comprise a local ROADM 14e, a downstream ROADM 14g, a first upstream ROADM 14d, and a second upstream ROADM 14f.

FIG. 7A depicts the first upstream ROADM 14d, the local ROADM 14e, and the second upstream ROADM 14f as each comprising only one MUX module 158 (i.e., the MUX module 158a, the MUX module 158b, and the MUX module 158c, respectively). However, it will be understood that each of the first upstream ROADM 14d, the local ROADM 14e, and the second upstream ROADM 14f may comprise more than one MUX module 158 and/or DEMUX module 160 and that only one MUX module 158 of each is depicted for purposes of clarity. Further, while FIG. 7A depicts the downstream ROADM 14g as comprising three DEMUX modules 160 (i.e., a first DEMUX module 160a, a second DEMUX module 160b, and a third DEMUX module 160c) and three MUX modules 158 (i.e., a first MUX module 158d, a second MUX module 158e, and a third MUX module 158f), it will be understood that the downstream ROADM 14g may comprise more or less than three MUX modules 158 and more or less than three DEMUX modules 160.

FIG. 7A also illustrates the concept of optically dependent MUX modules 158. A downstream MUX module 158 (e.g., the first MUX module 158d, the second MUX module 158e, or the third MUX module 158f) associated with a downstream fiber optic line 22 (e.g., the second fiber optic line 22f, the fourth fiber optic line 22h, or the sixth fiber optic line 22j, respectively) is said to be "optically dependent" on an upstream MUX module 158 (e.g., the MUX module 158b) associated with an upstream fiber optic line 22 (e.g., the third fiber optic line 22g) where the downstream fiber optic line 22 (e.g., the second fiber optic line 22f, the fourth fiber optic line 22h, or the sixth fiber optic line 22j) is optically dependent on the upstream fiber optic line 22 (e.g., the third fiber optic line 22g).

FIG. 7A depicts a configuration in which the local ROADM 14e is preparing to load a first optical service 178 on the third fiber optic line 22g. The downstream ROADM 14g is immediately downstream from the local ROADM 14e on the third fiber optic line 22g. In order to load the first optical service 178, a particular one of the processors (e.g., the processor 170 of the MUX module 158b) may execute the software applications 54, which may cause the processor 170 to: receive an operation to execute, the operation being a loading of a first optical service 178 on the third fiber optic line 22g by the local ROADM 14e; determine a status (i.e., a health status) of the downstream ROADM 14g as being available (i.e., "UP"); optionally, disable the local control blocks 190 of the local ROADM 14e; reserve the downstream ROADM 14g for the loading of the first optical service by preventing the downstream ROADM 14g from loading a second optical service 178 on any of the optically dependent fiber optic lines (i.e., the second fiber optic line 22f, the fourth fiber optic line 22h, and the sixth fiber optic line 22j, each of which are optically dependent on the third fiber optic line 22g) and disabling the control blocks 190 associated with each of the fiber optic lines 22f, 22h, and 22j (i.e., the control blocks 190 of the optically dependent MUX modules 158d, 158e, and 158f of the downstream ROADM 14g), thereby preventing the control blocks 190 from adjusting a configuration of the downstream ROADM 14g; and load the first optical service 178 on the third fiber optic line 22g.

In some embodiments, the software applications 54, when executed, further cause the processor 170 to determine that a first passband of the one or more passband is ready for loading the first optical service 178 on the third fiber optic line 22g.

In some embodiments, reserving the downstream ROADM 14g further comprises: sending a disable-adjust request to the downstream ROADM 14g, the disable-adjust request including instructions to reserve the downstream ROADM 14g for the loading of the first optical service 178 by preventing the downstream ROADM 14g from loading the second optical service 178 on any of the optically dependent fiber optic lines 22f, 22h, and 22j and disabling the associated control blocks 190 of the downstream ROADM 14g, thereby preventing the associated control blocks 190 from adjusting the configuration of the downstream ROADM 14g; and receiving a disable-adjust response from the downstream ROADM 14g, the disable-adjust response being indicative of one of a success and a failure of reserving the downstream ROADM 14g.

In some embodiments, a particular one of the processors (e.g., the processor 170 of the DEMUX module 160b) may execute the software applications 54, which may cause the processor 170 to: receive the disable-adjust request from the local ROADM 14e; send one or more distributed disable-adjust request to the one or more MUX module 158 associated with the optically dependent fiber optic lines 22f, 22h, and 22j (i.e., the optically dependent MUX modules 158d, 158e, and 158f of the downstream ROADM 14g), each of the one or more distributed disable-adjust request including instructions to reserve a particular optically dependent MUX module 158d, 158e, or 158f by preventing the particular optically dependent MUX module 158d, 158e, or 158f from loading the second optical service 178 on the optically dependent fiber optic lines 22f, 22h, and 22j, and disabling the control block(s) 190 of the particular optically dependent MUX module 158d, 158e, or 158f, thereby preventing the control block(s) 190 from adjusting a configuration of the particular optically dependent MUX module 158d, 158e, or 158f; receive one or more distributed disable-adjust response from the one or more optically dependent MUX module 158d, 158e, and 158f, each of the one or more distributed disable-adjust response being indicative of one of a success and a failure of reserving the particular optically dependent MUX module 158d, 158e, or 158f; and send a consolidated disable-adjust response to the local ROADM 14e (i.e., the orchestrator 186 of the local ROADM 14e), the consolidated disable-adjust response being indicative of one of a success and a failure of reserving each of the one or more optically dependent MUX module 158d, 158e, and 158f of the downstream ROADM 14g.

In some embodiments, the software applications 54, when executed by the processor 170 may further cause the processor 170 to: responsive to one or more distributed disable-adjust response being indicative of a failure of reserving a first particular optically dependent MUX module 158d, 158e, or 158f, and further responsive to one or more distributed disable-adjust response being indicative of a success of reserving a second particular optically dependent MUX module 158d, 158e, or 158f, transmit an enable-adjust request to each optically dependent MUX module 158d, 158e, and 158f from which a distributed disable-adjust response indicative of success was received; and send a consolidated disable-adjust response indicative of a failure of reserving the downstream ROADM 14g.

In some embodiments, the software applications 54, when executed by the processor 170 may further cause the processor 170 to: subsequent to sending the one or more distributed disable-adjust request to the optically dependent MUX modules 158d, 158e, and 158f, start a response consolidation timer and wait to receive the one or more distributed disable-adjust response from the optically dependent MUX modules 158f, 158e, and 158f, the response consolidation timer being set to expire after a predetermined time period; responsive to receiving each of the one or more distributed disable-adjust response before the response consolidation timer expires, stop the response consolidation timer; and responsive to the response consolidation timer expiring before receiving each of the one or more distributed disable-adjust response, transmit an enable-adjust request to each optically dependent MUX module 158 from which a distributed disable-adjust response indicative of success was received, and send a consolidated disable-adjust response indicative of a failure of reserving the downstream ROADM 14g.

In some embodiments, a particular one of the processors (e.g., the processor 170 of one of the MUX modules 158d, 158e, and 158f) may execute the software applications 54, which may cause the processor 170 to: receive a particular disable-adjust request of the one or more distributed disable-adjust request, the particular disable-adjust request including the instructions to reserve the particular optically dependent MUX module 158d, 158e, or 158f by preventing the particular optically dependent MUX module 158d, 158e, or 158f from loading the second optical service on the optically dependent fiber optic lines (i.e., the fiber optic lines 22f, 22h, or 22j) and disabling the control block(s) 190 of the particular optically dependent MUX module 158d, 158e, or 158f, thereby preventing the control block(s) 190 from adjusting a configuration of the particular optically dependent MUX module 158d, 158e, or 158f; and send a particular distributed disable-adjust response of the one or more distributed disable-adjust response to the DEMUX module 160b, the particular distributed disable-adjust response being indicative of one of a success and a failure of reserving the particular optically dependent MUX module 158d, 158e, or 158f.

In some embodiments, the software applications 54, when executed, further cause a particular one of the processors (e.g., the processor 170 of the MUX module 158b) to, subsequent to loading the first optical service on the third fiber optic line 22g, send an enable-adjust request to the downstream ROADM 14g, the enable-adjust request including second instructions to release the downstream ROADM 14g by allowing the downstream ROADM 14g to load the second optical service on any of the optically dependent fiber optic lines (i.e., the fiber optic lines 22f, 22h, or 22j) and enabling the associated control blocks 190 (i.e., the control blocks 190 of any of the optically dependent MUX modules 158d, 158e, and 158f of the downstream ROADM 14g), thereby allowing the control blocks 190 to adjust the configuration of the downstream ROADM 14g.

In some embodiments, determining the status of the downstream ROADM 14g further comprises: storing data (e.g., in the memory 174 of a particular one of the DEMUX modules 160a, 160b, and 160c) indicative of a current status of the downstream ROADM 14g; receiving, by the particular DEMUX module 160a, 160b, or 160c of the downstream ROADM 14g, a status message from at least one of the optically dependent MUX modules 158d, 158e, and 158f of the downstream ROADM 14g, the status message being indicative of a changed status of the at least one of the optically dependent MUX modules 158d, 158e, and 158f, the changed status being less available than the current status; and sending, by the particular DEMUX module 160a, 160b, or 160c that received the status message, a consolidated status message to the orchestrator (e.g., the orchestrator 186 of the MUX module 158a of the first upstream ROADM 14d, the MUX module 158b of the local ROADM 14e, or the MUX module 158c of the second upstream ROADM 14f), the consolidated status message being indicative of the changed status.

In some embodiments, the software applications 54, when executed, cause a particular one of the processors (e.g., the processor 170 of one of the optically dependent MUX module 158d, 158e, and 158f) to: send a first status message to an upstream ROADM 14 (e.g., the first upstream ROADM 14d or the second upstream ROADM 14f), the upstream ROADM 14 being upstream from the downstream ROADM 14g on one of the fiber optic lines 22e or 22i, the first status message being indicative of a busy (i.e., "BUSY") status of the downstream ROADM 14g; and send a second status message to the local ROADM 14e, the second status message being indicative of a reserved (i.e., "DISABLED") status of the downstream ROADM 14g.

Where a status message is received by an upstream ROADM 14 (e.g., the first upstream ROADM 14d or the second upstream ROADM 14f) from a downstream ROADM 14 (e.g., the downstream ROADM 14g), and the status message is indicative of a busy status of the downstream ROADM 14g, the upstream ROADM 14d or 14f may be unable to load an optical service 178 on a fiber optic line 22 (e.g., the fiber optic lines 22e or 22i).

Figure 7B:
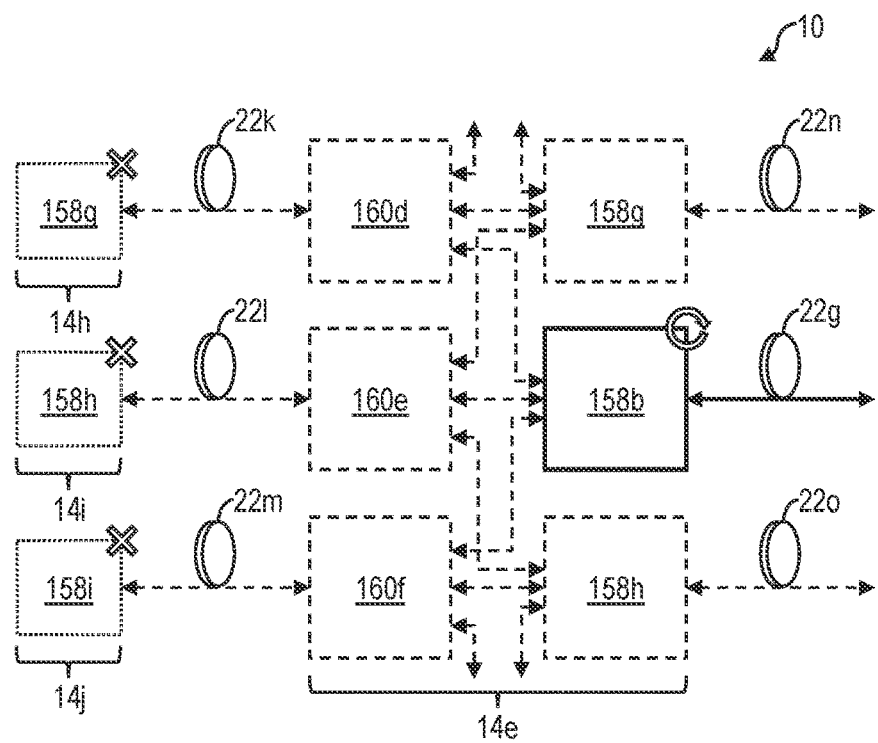
FIG. 7B is another block diagram of the transport network shown in FIG. 7A.

Referring now to FIG. 7B, shown therein is another diagram of the transport network 10 shown in FIG. 7A. In this view, it can be seen that the local ROADM 14e is immediately downstream from a third upstream ROADM 14h, a fourth upstream ROADM 14i, and a fifth upstream ROADM 14j, on a seventh fiber optic line 22k, an eighth fiber optic line 22l, and a ninth fiber optic line 22m, respectively. Further, it can be seen that the transport network 10 further comprises a tenth fiber optic line 22n and an eleventh fiber optic line 22o, and the local ROADM 14e comprises three MUX modules 158 (i.e., the MUX module 158b, a seventh MUX module 158g, and an eighth MUX module 158h) and three DEMUX modules 160 (i.e., a fourth DEMUX module 160d, a fifth DEMUX module 160e, and a sixth DEMUX module 160f). As in FIG. 7A, FIG. 7B depicts a configuration in which the local ROADM 14e is preparing to load the first optical service 178 on the third fiber optic line 22g.

In some embodiments, the software applications 54, when executed, further cause a particular one of the processors (e.g., the processor 170 of one of the DEMUX modules 160d, 160e, and 160f) to: send a status message to an upstream ROADM 14 (e.g., the third upstream ROADM 14h, the fourth upstream ROADM 14i, and/or the fifth upstream ROADM 14j), the upstream ROADM 14 being upstream from the local ROADM 14e on one of the fiber optic lines 22 (i.e., the fiber optic lines 22k, 22l, and 22m), the status message being indicative of a busy status (i.e., "BUSY") of the local ROADM 14e.

In some embodiments, the software applications 54, when executed, further cause a particular one of the processors (e.g., the processor 170 of the MUX module 158b) to: disable the control blocks 190 associated with the MUX module 158b of the local ROADM 14e, thereby preventing the control blocks 190 from adjusting a local configuration of the local ROADM 14e; and responsive to the disable-adjust response being indicative of a failure, enable the control blocks 190 of the local ROADM 14e, thereby allowing the control blocks 190 to adjust the local configuration of the MUX module 158b of the local ROADM 14e.

As shown in FIG. 7B, the MUX module 158b of the local ROADM 14e is reserved for the loading of the first optical service onto the third fiber optic line 22g. Accordingly, the software applications 54, when executed, may further cause the processor 170 of any of the DEMUX modules 160d, 160e, or 160f to: receive a disable-adjust request from any of the upstream ROADMs 14h, 14i, or 14j, the disable-adjust request including instructions to reserve the local ROADM 14e for loading a third optical service 178 by preventing the local ROADM 14e from loading the first optical service 178 on the any of the optically dependent fiber optic lines 22n, 22g, and 22o and disabling the control blocks 190 of the local ROADM 14e, thereby preventing the control blocks 190 from adjusting the configuration of the local ROADM 14e; and send a disable-adjust response to the upstream ROADM 14 that sent the disable-adjust request, the disable-adjust response being indicative of a failure of reserving the local ROADM 14e. This may have the effect of preventing the upstream ROADMs 14h, 14i, or 14j from loading the third optical service 178.

Several different requests and responses are described herein. The requests may include a disable-adjust request, an enable-adjust request, a MUX-WSS-controls-adjust request, and a link-controls adjust request. As described herein, the disable-adjust request may include instructions to reserve a receiving ROADM 14 (i.e., the ROADM 14 that received the request) for loading an optical service by preventing the receiving ROADM 14 from loading the optical service on an optically dependent fiber optic line 22 and disabling the control blocks 190 of the ROADM 14, thereby preventing the control blocks 190 from adjusting the configuration of the receiving ROADM 14. Disabling the control blocks 190 may cause the control blocks 190 to cease performing automatic adjustments of the associated optical device(s) in response to changes in power levels. Further, as described herein, the enable-adjust request may include instructions to release the receiving ROADM 14 by allowing the receiving ROADM 14 to load the optical service on the optically dependent fiber optic line 22 and enabling the control blocks 190 of the receiving ROADM 14, thereby allowing the control blocks 190 to adjust the configuration of the receiving ROADM 14. The MUX-WSS-controls-adjust request may include instructions to adjust a configuration of the MUX modules 158 of the receiving ROADM 14 to meet a reference power level for all the optically dependent optical services being expressed by the receiving ROADM 14. The link-controls-adjust request may include instructions to adjust a configuration of an OA 24 on the fiber optic line 22 to meet an optical band target on all the optically dependent MUX modules 158 of the receiving ROADM 14. For each of the requests, a corresponding response may be indicative of a success or a failure of completing the request.

Figure 8:
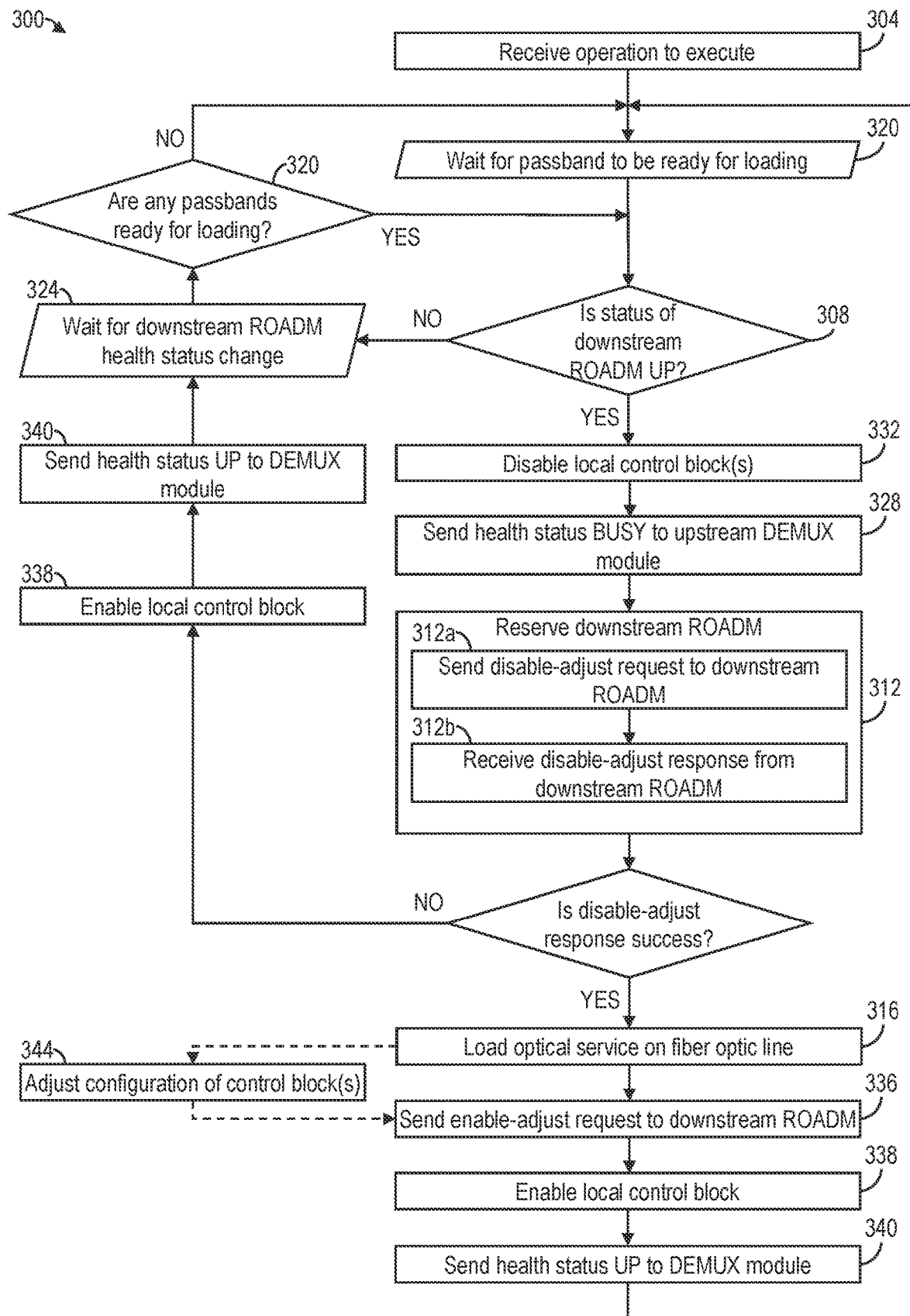
FIG. 8 is a process flow diagram of a method of loading an optical service on a fiber optic line according to the present disclosure.

Referring now to FIG. 8, shown therein is an exemplary embodiment of a method 300 for loading an optical service on a fiber optic line 22 according to the present disclosure. The method 300 may comprise: receiving, by an orchestrator 186 (i.e., the orchestrator 186 of the computer system 26, the orchestrator 186 of any of the ROADMs 14, and/or the orchestrator 186 of any of the WSS modules 74) of a transport network 10, an operation to execute, the transport network 10 comprising a fiber optic line 22 and two or more ROADMs 14, the operation being a loading of a first optical service 178 on the fiber optic line 22 by a local ROADM 14 (step 304); determining a status of a downstream ROADM 14 as being available (i.e., "UP"), the downstream ROADM 14 being downstream from the local ROADM 14 on the fiber optic line 22 (step 308); reserving the downstream ROADM 14 for the loading of the first optical service by preventing the downstream ROADM 14 from loading a second optical service on the fiber optic line 22 and disabling control blocks 190 of the downstream ROADM 14, thereby preventing the control blocks 190 from adjusting a configuration of the downstream ROADM 14 (step 312); and loading, by the local ROADM 14, the first optical service on the fiber optic line 22 (step 316).

As discussed above, the fiber optic line 22 may comprise one or more passband. Accordingly, in some embodiments, the method further comprises determining that a first passband of the one or more passband is ready for loading the first optical service 178 on the fiber optic line 22 (step 320). In some embodiments, if it is determined that the status of the downstream ROADM 14 is not available (i.e., "BUSY" or "DOWN"), the method further comprises: waiting for the status of the downstream ROADM 14 to change (step 324); and, responsive to the determination that the status of the downstream ROADM 14 has changed, returning to determining that the first passband is ready for loading the first optical service 178 on the fiber optic line 22 (step 320) or determining the status of the downstream ROADM (step 308).

The method 300 may further comprise, prior to reserving the downstream ROADM (step 312): sending a status message to an upstream ROADM 14 of the two or more ROADMs 14, the upstream ROADM 14 being upstream from the local ROADM 14 on the fiber optic line 22, wherein the status message is indicative of a busy (i.e., "BUSY") status of the local ROADM 14 (step 328); and disabling one or more local control block of the local ROADM 14, thereby preventing the one or more local control block from adjusting a local configuration of the local ROADM 14 (step 332). As shown in FIG. 8, reserving the downstream ROADM (step 312) may further comprise: sending a disable-adjust request to the downstream ROADM 14, the disable-adjust request including instructions to reserve the downstream ROADM 14 for the loading of the first optical service 178 by preventing the downstream ROADM 14 from loading the second optical service 178 on the fiber optic line 22 and disabling the one or more downstream control block 190, thereby preventing the one or more downstream control block 190 from adjusting the configuration of the downstream ROADM 14 (step 312a); and receiving a disable-adjust response from the downstream ROADM 14, the disable-adjust response being indicative of one of a success and a failure of reserving the downstream ROADM 14 (step 312b).

If the disable-adjust response is indicative of a success of reserving the downstream ROADM 14, the method 300 may proceed to: loading the first optical service on the fiber optic line 22 (step 316); sending an enable-adjust request to the downstream ROADM 14, the enable-adjust request including second instructions to release the downstream ROADM 14 by allowing the downstream ROADM 14 to load the second optical service 178 on the fiber optic line 22 and enabling the one or more downstream control block 190, thereby allowing the one or more downstream control block 190 to adjust the configuration of the downstream ROADM 14 (step 336); enabling the local control blocks 190 of the local ROADM 14, thereby allowing the one or more local control blocks 190 to adjust the configuration of the local ROADM 14 (step 338); and sending a status message to an upstream ROADM 14, wherein the status message is indicative of an available (i.e., "UP") status of the local ROADM 14 (step 340).

In some embodiments, between loading the first optical service on the fiber optic line 22 (step 316) and sending the enable-adjust request to the downstream ROADM 14 (step 336), the method 300 may further comprise adjusting a configuration of one or more control blocks 190 (e.g., the one or more control blocks 190 of the local ROADM 14 and/or the one or more control blocks 190 of the downstream ROADM 14) (step 344).

Responsive to the disable-adjust response being indicative of a failure of reserving the downstream ROADM 14, the method 300 may further comprise enabling the one or more local control blocks 190, thereby allowing the one or more local control blocks 190 to adjust the local configuration of the local ROADM 14 (step 338). Further, the method 300 may comprise sending a status message to an upstream ROADM 14, wherein the status message is indicative of an available (i.e., "UP") status of the local ROADM 14 (step 340); and returning to waiting for the status of the downstream ROADM 14 to change (step 324).

As discussed above, sending the disable-adjust request to the downstream ROADM 14 (step 312a) and receiving the disable-adjust response from the downstream ROADM 14 (step 312b) may reserve the downstream ROADM 14 for the loading of the first optical service 178. Accordingly, in some embodiments, the method 300 further comprises: sending, by the downstream ROADM 14, a first status message to an upstream ROADM 14 of the two or more ROADMs 14, the upstream ROADM 14 being upstream from the downstream ROADM 14 on a second fiber optic line 22, the first status message being indicative of a busy (i.e., "BUSY") status of the downstream ROADM 14; and sending, by the downstream ROADM 14, a second status message to the local ROADM 14, the second status message being indicative of a reserved (i.e., "DISABLED") status of the downstream ROADM 14.

Reserving the downstream ROADM 14 for the loading of the first optical service may cause the downstream ROADM 14 to deny any disable-adjust requests received by the downstream ROADM 14 from an upstream ROADM 14 other than the upstream ROADM 14 that reserved the downstream ROADM 14. Accordingly, in some embodiments, the method 300 further comprises: sending a second disable-adjust request to the downstream ROADM 14, the second disable-adjust request including second instructions to reserve the downstream ROADM 14 for a loading of a third optical service 178 on a second fiber optic line 22 by an upstream ROADM 14 by preventing the downstream ROADM 14 from loading the second optical service 178 on the first fiber optic line 22 and disabling the one or more downstream control block, thereby preventing the one or more downstream control block 190 from adjusting the configuration of the downstream ROADM 14, the upstream ROADM 14 being upstream from the downstream ROADM 14 on the second fiber optic line 22; and receiving a disable-adjust response from the downstream ROADM 14, the disable-adjust response being indicative of a failure of reserving the downstream ROADM 14.

Sending the status message indicative of the busy (i.e., "BUSY") status of the local ROADM 14 to the upstream ROADM 14 (step 328) and disabling one or more local control block 190 (step 332) may reserve the local ROADM 14 for the loading of the first optical service 178. Accordingly, in some such embodiments, the method 300 further comprises: receiving a disable-adjust request from the upstream ROADM 14, the disable-adjust request including first instructions to reserve the local ROADM 14 for loading a third optical service 178 by preventing the local ROADM 14 from loading the first optical service on the fiber optic line 22 and disabling the one or more local control block 190, thereby preventing the one or more local control block 190 from adjusting the configuration of the local ROADM 14; and sending a disable-adjust response to the upstream ROADM 14, the disable-adjust response being indicative of a failure of reserving the local ROADM 14.

Figure 9A:
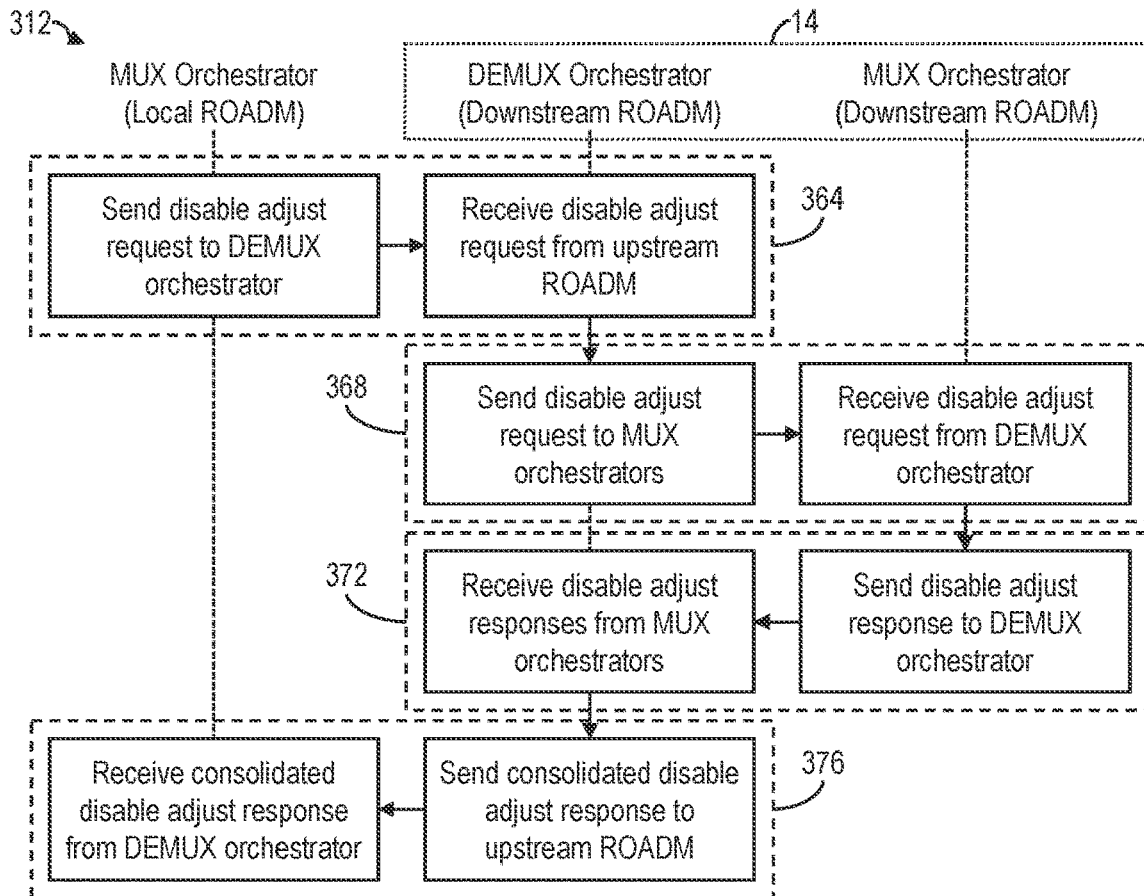
FIG. 9A is a process flow diagram of a step of reserving a downstream ROADM shown in FIG. 8.

Referring now to FIG. 9A, in some embodiments, reserving the downstream ROADM (step 312) further comprises: receiving, by the DEMUX module 160 of the downstream ROADM 14, the disable-adjust request (step 364); sending, by the DEMUX module 160, one or more distributed disable-adjust request to the one or more optically dependent MUX module 158 of the downstream ROADM 14, each of the one or more distributed disable-adjust request including second instructions to reserve a particular MUX module 158 of the one or more optically dependent MUX module 158 by preventing the particular MUX module 158 from loading the second optical service on the fiber optic line 22 and disabling the one or more control block 190 of the particular MUX module 158, thereby preventing the one or more control block 190 from adjusting a configuration of the particular MUX module 158 (step 368); receiving, by the DEMUX module 160, one or more distributed disable-adjust response from the one or more optically dependent MUX module 158, each of the one or more distributed disable-adjust response being indicative of one of a success and a failure of reserving the particular optically dependent MUX module 158 (step 372); and sending, by the DEMUX module 160, a consolidated disable-adjust response to the local ROADM 14, the consolidated disable-adjust response being indicative of one of a success and a failure of reserving each of the one or more optically dependent MUX module (step 376).

Figure 9B:
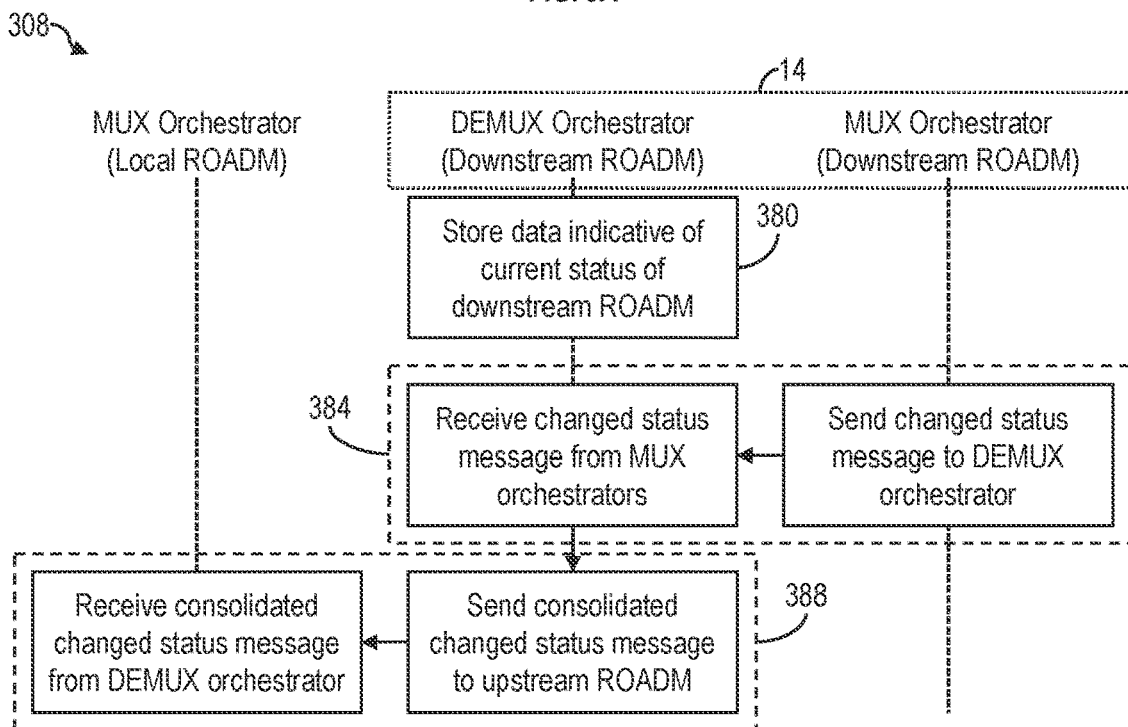
FIG. 9B is a process flow diagram of a step of determining a status of a downstream ROADM shown in FIG. 8.

Referring now to FIG. 9B, in some embodiments, determining the status of the downstream ROADM 14 (step 308) further comprises: storing (e.g., in the memory 174 of the DEMUX module 160 of the downstream ROADM 14) data indicative of a current status of the downstream ROADM 14 (step 380); receiving, by the DEMUX module 160 of the downstream ROADM 14, a status message from at least one of the one or more optically dependent MUX module 158 of the downstream ROADM 14, the status message being indicative of a changed status of the at least one of the one or more optically dependent MUX module 158, the changed status being less available than the current status stored (e.g., in the memory 174 of the DEMUX module 160 of the downstream ROADM 14) (step 384); and sending, by the DEMUX module 160, a consolidated status message to the local ROADM 14, the consolidated status message being indicative of the changed status (step 388). Upon receiving the consolidated status message, the local ROADM 14 may determine the status of the downstream ROADM 14 (step 308) based at least in part on the consolidated status message.

Figure 10:
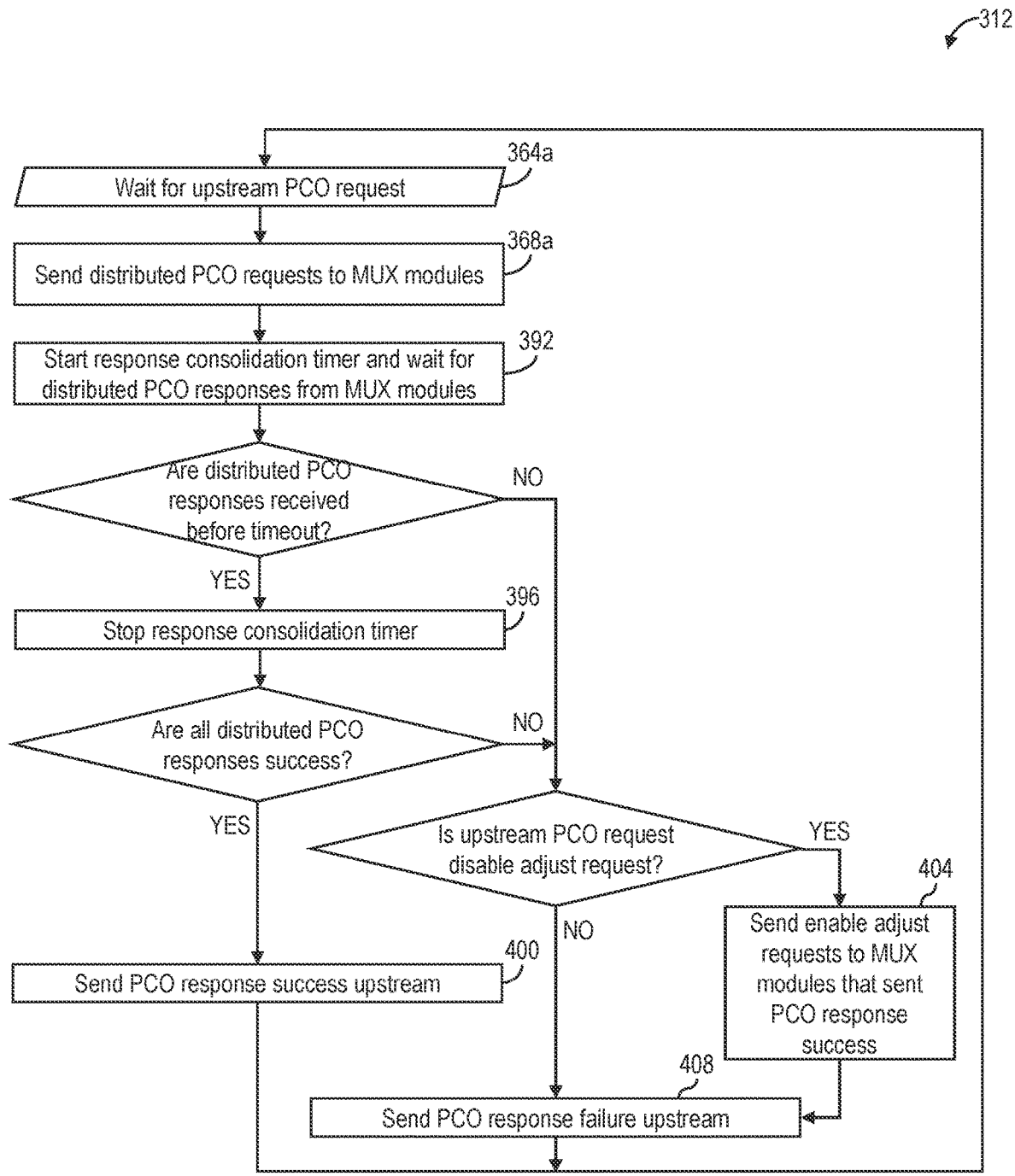
FIG. 10 is another process flow diagram of a step of reserving a downstream ROADM shown in FIG. 8.

Referring now to FIG. 10, in some embodiments, reserving the downstream ROADM 14 (step 312) comprises waiting to receive, by a DEMUX module 160 of the downstream ROADM 14, a PCO request from an upstream ROADM 14 (i.e., the local ROADM 14) (step 364a); sending, by the DEMUX module 160, one or more distributed PCO request to one or more optically dependent MUX module 158 of the downstream ROADM 14 (step 368a); starting a response consolidation timer and wait to receive one or more distributed PCO response from the one or more optically dependent MUX module 158, the response consolidation timer being set to expire after a predetermined time period (step 392); responsive to receiving each of the one or more distributed PCO response before the response consolidation timer expires, stopping the response consolidation timer (step 396); and responsive to each of the received distributed PCO responses being indicative of a success, sending, by the DEMUX module 160, a consolidated PCO response to the upstream ROADM 14, the consolidated PCO response being indicative of the success of each of the distributed PCO requests (step 400).

Responsive to the response consolidation timer expiring before receiving each of the one or more distributed PCO response, or responsive to one or more of the distributed PCO responses being indicative of a failure, reserving the downstream ROADM 14 (step 312) may further comprise: if the PCO request is a disable-adjust request, sending, by the DEMUX module 160, an enable-adjust request to each of the optically dependent MUX modules 158 that sent a distributed PCO response (i.e., a distributed disable-adjust response) indicative of a success (step 404); and sending, by the DEMUX module 160, a consolidated PCO response to the upstream ROADM 14, the consolidated PCO response being indicative of the failure of each of the distributed PCO requests (step 408); and, if the PCO request is not a disable-adjust request, sending, by the DEMUX module 160, a consolidated PCO response to the upstream ROADM 14, the consolidated PCO response being indicative of the failure of each of the distributed PCO requests (step 408).

Figure 11:
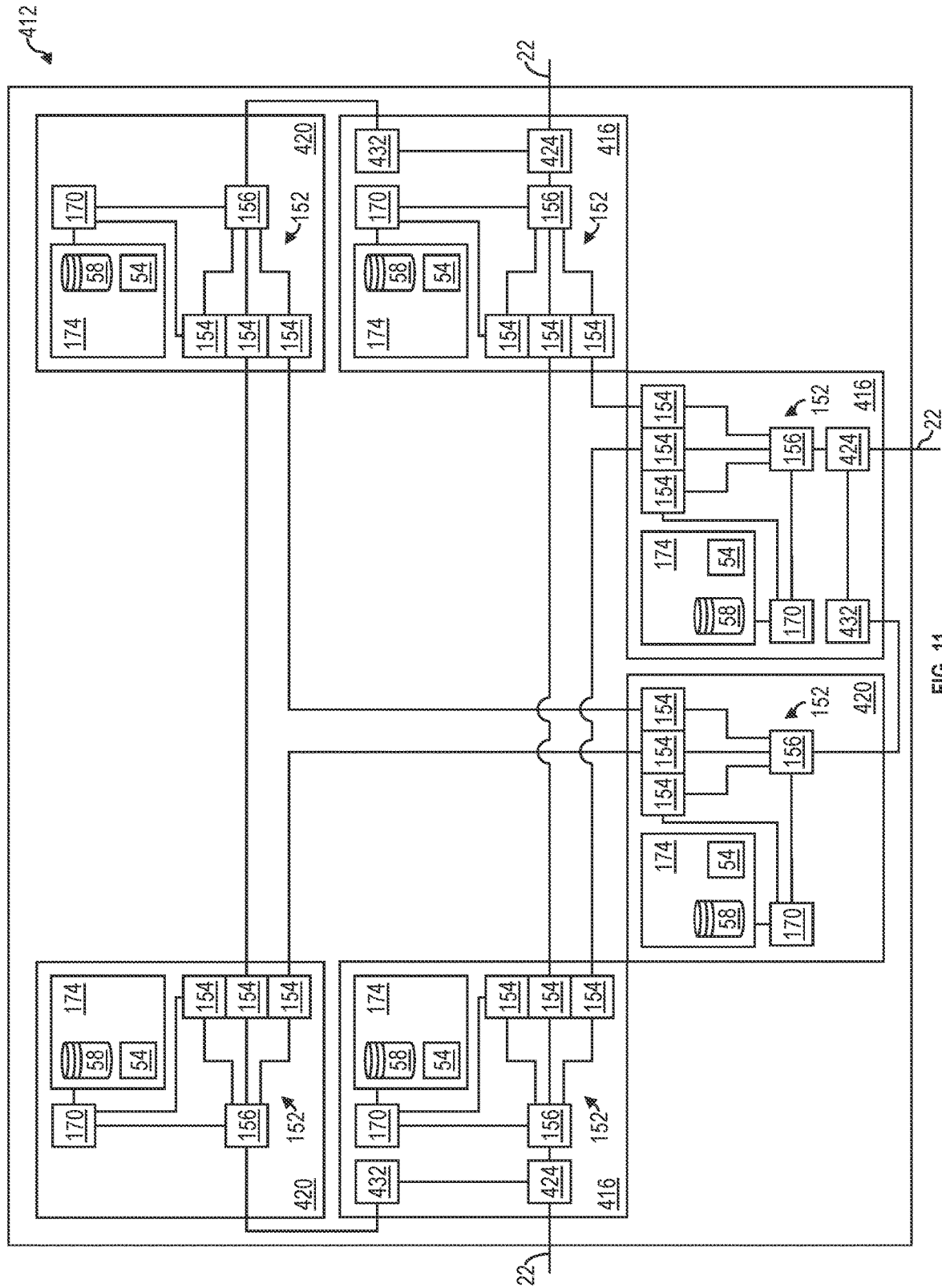
FIG. 11 is a block diagram of an exemplary embodiment of a C+L-band ROADM constructed in accordance with the present disclosure.

Referring now to FIG. 11, shown therein is a block diagram of an exemplary embodiment of a C+L-band (or "C/L-band") ROADM 412. While the C+L-band ROADM 412 shown in FIG. 11 is a three-degree C+L-band ROADM 412, persons having ordinary skill in the art will understand that the C+L-band ROADM 412 may have more or less than three degrees. The C+L-band ROADM 412 may comprise a plurality of C-band WSS modules 416 and a plurality of L-band WSS modules 420. Each of the C-band WSS modules 416 and the L-band WSS modules 420 may comprise a WSS 152, a processor 170, and a memory 174, which may store the software applications 54 and the database 58. Each WSS 152 may comprise one or more tributary port 154 and one or more line port 156. While each WSS 152 is shown comprising three tributary ports 154 and one line port 156, persons having ordinary skill in the art will understand that each WSS 152 may have more or less than three tributary ports 154 and more than one line port 156.

Each of the C-band WSS modules 416 may further comprise a coupler/splitter 424 connected to the fiber optic line 22 on one side and the line port 156 of the WSS 152 on the other side. C+L-band optical signals received by the C-band WSS module 416 may be split by the coupler/splitter 424 such that the received optical signals are sent to a line port 156 of the C-band WSS module 416 and the received optical signals are sent to an expansion port 432, which may be connected via a patch cable connection to a line port 156 of the L-band WSS module 420. Further, C-band optical signals sent by the C-band WSS module 416 and L-band optical signals sent by the L-band WSS module 420 may be coupled by the coupler/splitter 424 such that C+L-band optical signals are sent on the fiber optic line 22.

As shown in FIG. 11, the tributary ports 154 of the C-band WSS modules 416 may be connected to each other, and the tributary ports 154 of the L-band WSS modules 420 may be connected to each other as well.

In some embodiments, one or more of the ROADMs 14 described herein (e.g., the local ROADM 14) is a C+L-band ROADM 412. In such embodiments, the operation is further defined as the loading of the first optical service within the C-band optical signals or the L-band optical signals on the fiber optic line 22 by the local ROADM 14, and loading the first optical service on the fiber optic line 22 (step 316) is further defined as loading, by the local ROADM 14, the first optical service within the C-band optical signals or the L-band optical signals on the fiber optic line 22.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A method, comprising:
    storing, by a de-multiplexer (DEMUX) module of a reconfigurable optical add-drop multiplexer (ROADM), data indicative of a current status of the ROADM, the ROADM comprising the DEMUX module and one or more multiplexer (MUX) module;
    receiving, by the DEMUX module, a status message from at least one of the one or more MUX module, the status message being indicative of a changed status of the at least one of the one or more MUX module;
    determining, by the DEMUX module, that the changed status of the at least one of the one or more MUX module is less available than the current status of the ROADM; and
    responsive to the determination that the changed status is less available than the current status, storing, by the DEMUX module, the changed status as the current status.

2. The method of claim 1, wherein the ROADM is a local ROADM of an optical network comprising a fiber optic line, the local ROADM, and an upstream ROADM, the upstream ROADM being upstream from the local ROADM on the fiber optic line, the method further comprising, subsequent to storing the changed status as the current status, sending, by the DEMUX module, a consolidated status message to the upstream ROADM, the consolidated status message being indicative of the current status of the local ROADM.

3. A method, comprising:
    receiving, by a de-multiplexer (DEMUX) module of a local reconfigurable optical add-drop multiplexer (ROADM) of an optical network, a request from an upstream ROADM, the optical network comprising a fiber optic line, the local ROADM, and the upstream ROADM, the upstream ROADM being upstream from the local ROADM on the fiber optic line, the local ROADM comprising the DEMUX module, a first multiplexer (MUX) module, and a second MUX module, the request including first instructions to perform an operation on the local ROADM;
    sending, by the DEMUX module, a distributed request to the first MUX module and the second MUX module, the distributed request including second instructions to perform the operation on the first MUX module and the second MUX module;
    attempting, by the first MUX module, to perform the operation;
    attempting, by the second MUX module, to perform the operation; and
    sending a consolidated response to the upstream ROADM, the consolidated response being indicative of one of a success and a failure of performing the operation on the first MUX module and the second MUX module.

4. The method of claim 3, further comprising, subsequent to sending the distributed request to the first MUX module and the second MUX module, starting, by the DEMUX module, a response consolidation timer, the response consolidation timer being set to expire after a predetermined time period.

5. The method of claim 4, further comprising receiving, by the DEMUX module, a first distributed response from the first MUX module and a second distributed response from the second MUX module, the first distributed response being indicative of one of a success and a failure of performing the operation on the first MUX module and the second distributed response being indicative of one of a success and a failure of performing the operation on the second MUX module, wherein sending the consolidated response to the upstream ROADM is further defined as sending, by the DEMUX module, the consolidated response to the upstream ROADM.

6. The method of claim 5, further comprising:
    subsequent to receiving the first distributed response and the second distributed response, stopping, by the DEMUX module, the response consolidation timer; and
    determining, by the DEMUX module, that the first distributed response and the second distributed response are indicative of a success of performing the operation on the first MUX module and the second MUX module; and
    wherein sending the consolidated response to the upstream ROADM is further defined as, responsive to the determination that the first distributed response is indicative of a success of performing the operation on the first MUX module and the second distributed response is indicative of a success of performing the operation on the second MUX module, sending the consolidated response, the consolidated response being indicative of a success of performing the operation on the first MUX module and the second MUX module.

7. The method of claim 5, further comprising:
    subsequent to receiving the first distributed response and the second distributed response, stopping, by the DEMUX module, the response consolidation timer; and
    determining, by the DEMUX module, that at least one of the first distributed response and the second distributed response is indicative of a failure of performing the operation on at least one of the first MUX module and the second MUX module; and
    wherein sending the consolidated response to the upstream ROADM is further defined as, responsive to the determination that at least one of the first distributed response and the second distributed response is indicative of a failure of performing the operation on at least one of the first MUX module and the second MUX module, sending the consolidated response, the consolidated response being indicative of a failure of performing the operation on the first MUX module and the second MUX module.

8. The method of claim 7, wherein the operation is a first operation, and the method further comprises:
    determining, by the DEMUX module, that the request is a disable-adjust request wherein the first operation is a reservation of the local ROADM, thereby preventing the local ROADM from loading an optical service on the fiber optic line and disabling one or more ROADM control block of the local ROADM, thereby preventing the one or more ROADM control block from adjusting a configuration of the local ROADM;

determining, by the DEMUX module, that a particular distributed response of the first distributed response and the second distributed response is indicative of a success of performing the first operation on a particular MUX module of the first MUX module and the second MUX module; and prior to sending the consolidated response, sending an enable-adjust request to the particular MUX module that sent the particular distributed response, the enable-adjust request including instructions to perform a second operation on the particular MUX module to which it is sent, the second operation being a release of the particular MUX module, thereby allowing the particular MUX module to load the optical service on the fiber optic line and enabling one or more MUX control block of the particular MUX module, thereby allowing the one or more MUX control block to adjust a MUX configuration of the particular MUX module.

9. The method of claim 4, wherein sending the consolidated response is further defined as, responsive to the response consolidation timer expiring, sending the consolidated response, the consolidated response being indicative of a failure of performing the operation on the first MUX module and the second MUX module.

10. The method of claim 5, wherein receiving the first distributed response and the second distributed response is further defined as receiving a particular distributed response of the first distributed response and the second distributed response from a particular MUX module of the first MUX module and the second MUX module, and sending the consolidated response is further defined as, responsive to the response consolidation timer expiring before receiving the first distributed response and the second distributed response, sending the consolidated response, the consolidated response being indicative of a failure of performing the operation on the first MUX module and the second MUX module.

11. The method of claim 10, wherein the operation is a first operation, and the method further comprises:

determining, by the DEMUX module, that the request is a disable-adjust request wherein the first operation is a reservation of the local ROADM, thereby preventing the local ROADM from loading an optical service on the fiber optic line and disabling one or more ROADM control block of the local ROADM, thereby preventing the one or more ROADM control block from adjusting a configuration of the local ROADM;

determining, by the DEMUX module, that the particular distributed response is indicative of a success of performing the first operation on the particular MUX that sent the particular distributed response; and prior to sending the consolidated response, sending, by the DEMUX module, an enable-adjust request to the particular MUX module that sent the particular distributed response, the enable-adjust request including instructions to perform a second operation on the particular MUX module to which it is sent, the second operation being a release of the particular MUX module, thereby allowing the particular MUX module to load the optical service on the fiber optic line and enabling one or more MUX control block of the particular MUX module, thereby allowing the one or more MUX control block to adjust a MUX configuration of the particular MUX module.

12. An optical network, comprising:
a fiber optic line; and
two or more reconfigurable optical add-drop multiplexers (ROADMs), a local ROADM of the two or more ROADMs comprising one or more control block, a de-multiplexer (DEMUX) module, a first multiplexer (MUX) module, and a second MUX module, the DEMUX module comprising a DEMUX processor and a DEMUX non-transitory computer-readable medium storing DEMUX processor-executable instructions that, when executed, cause the DEMUX processor to:

receive a request from an upstream ROADM of the two or more ROADMs, the upstream ROADM being upstream from the local ROADM on the fiber optic line, the request including first instructions to perform an operation on the local ROADM;

send a distributed request to the first MUX module and the second MUX module, the distributed request including second instructions to perform the operation on the first MUX module and the second MUX module; and send a consolidated response to the upstream ROADM, the consolidated response being indicative of one of a success and a failure of performing the operation on the first MUX module and the second MUX module; and wherein the first MUX module comprises a first MUX processor and a first MUX non-transitory computer-readable medium and the second MUX module comprises a second MUX processor and a second MUX non-transitory computer-readable medium, the first MUX non-transitory computer-readable medium and the second MUX non-transitory computer-readable medium storing MUX processor-executable instructions that, when executed, cause the first MUX processor and the second MUX processor to:

receive the distributed request from the DEMUX module; and attempt to perform the operation.

13. The optical network of claim 12, wherein the DEMUX processor-executable instructions, when executed, further cause the DEMUX processor to, subsequent to sending the distributed request to the first MUX module and the second MUX module, start a response consolidation timer, the response consolidation timer being set to expire after a predetermined time period.

14. The optical network of claim 13, wherein the DEMUX processor-executable instructions, when executed, further cause the DEMUX processor to receive a first distributed response from the first MUX module and a second distributed response from the second MUX module, the first distributed response being indicative of one of a success and a failure of performing the operation on the first MUX module and the second distributed response being indicative of one of a success and a failure of performing the operation on the second MUX module.

15. The optical network of claim 14, wherein the DEMUX processor-executable instructions, when executed, further cause the DEMUX processor to:

subsequent to receiving the first distributed response and the second distributed response, stop the response consolidation timer; and determine that the first distributed response and the second distributed response are indicative of a success of performing the operation on the first MUX module and the second MUX module; and wherein sending the consolidated response to the upstream ROADM is further defined as, responsive to the determination that the first distributed response is indicative of a success of performing the operation on the first MUX module and the second distributed response is indicative of a success of performing the operation on the second MUX module, sending the consolidated response, the consolidated response being indicative of a success of performing the operation on the first MUX module and the second MUX module.

16. The optical network of claim 14, wherein the DEMUX processor-executable instructions, when executed, further cause the DEMUX processor to:

subsequent to receiving the first distributed response and the second distributed response, stopping the response consolidation timer; and determining that at least one of the first distributed response and the second distributed response is indicative of a failure of performing the operation on at least one of the first MUX module and the second MUX module; and wherein sending the consolidated response to the upstream ROADM is further defined as, responsive to the determination that at least one of the first distributed response and the second distributed response is indicative of a failure of performing the operation on at least one of the first MUX module and the second MUX module, sending the consolidated response, the consolidated response being indicative of a failure of performing the operation on the first MUX module and the second MUX module.

17. The optical network of claim 16, wherein the operation is a first operation, and the DEMUX processor-executable instructions, when executed, further cause the DEMUX processor to:

determine that the request is a disable-adjust request wherein the first operation is a reservation of the local ROADM, thereby preventing the local ROADM from loading an optical service on the fiber optic line and disabling one or more ROADM control block of the local ROADM, thereby preventing the one or more ROADM control block from adjusting a configuration of the local ROADM;

determine that a particular distributed response of the first distributed response and the second distributed response is indicative of a success of performing the first operation on a particular MUX module of the first MUX module and the second MUX module; and prior to sending the consolidated response, send an enable-adjust request to the particular MUX module that sent the particular distributed response, the enable-adjust request including instructions to perform a second operation on the particular MUX module to which it is sent, the second operation being a release of the particular MUX module, thereby allowing the particular MUX module to load the optical service on the fiber optic line and enabling one or more MUX control block of the particular MUX module, thereby allowing the one or more MUX control block to adjust a MUX configuration of the particular MUX module.

18. The optical network of claim 13, wherein sending the consolidated response is further defined as, responsive to the response consolidation timer expiring, sending the consolidated response, the consolidated response being indicative of a failure of performing the operation on the first MUX module and the second MUX module.

19. The optical network of claim 14, wherein receiving the first distributed response and the second distributed response is further defined as receiving a particular distributed response of the first distributed response and the second distributed response from a particular MUX module of the first MUX module and the second MUX module, and sending the consolidated response is further defined as, responsive to the response consolidation timer expiring before receiving the first distributed response and the second distributed response, sending the consolidated response, the consolidated response being indicative of a failure of performing the operation on the first MUX module and the second MUX module.

20. The optical network of claim 19, wherein the operation is a first operation, and the DEMUX processor-executable instructions, when executed, further cause the DEMUX processor to:

determine that the request is a disable-adjust request wherein the first operation is a reservation of the local ROADM, thereby preventing the local ROADM from loading an optical service on the fiber optic line and disabling one or more ROADM control block of the local ROADM, thereby preventing the one or more ROADM control block from adjusting a configuration of the local ROADM;

determine that the particular distributed response is indicative of a success of performing the first operation on the particular MUX that sent the particular distributed response; and prior to sending the consolidated response, send an enable-adjust request to the particular MUX module that sent the particular distributed response, the enable-adjust request including instructions to perform a second operation on the particular MUX module to which it is sent, the second operation being a release of the particular MUX module, thereby allowing the particular MUX module to load the optical service on the fiber optic line and enabling one or more MUX control block of the particular MUX module, thereby allowing the one or more MUX control block to adjust a MUX configuration of the particular MUX module.

* * * * *